(12) United States Patent
van der Ende et al.

(10) Patent No.: US 10,964,438 B2
(45) Date of Patent: Mar. 30, 2021

(54) SYSTEM AND METHOD FOR STAND-OFF MONITORING OF NUCLEAR REACTORS USING NEUTRON DETECTION

(71) Applicant: Atomic Energy Of Canada Limited / Énergie Atomique Du Canada Limitée, Chalk River (CA)

(72) Inventors: Bryan van der Ende, Pembroke (CA); Bhaskar Sur, Deep River (CA)

(73) Assignee: Atomic Energy Of Canada Limited / Energie Atomique Du Canada Limitee, Chalk River (CA)

(*) Notice: Subject to any disclaimer, the term of this patent is extended or adjusted under 35 U.S.C. 154(b) by 371 days.

(21) Appl. No.: 15/712,898

(22) Filed: Sep. 22, 2017

(65) Prior Publication Data

US 2018/0350473 A1    Dec. 6, 2018

Related U.S. Application Data

(60) Provisional application No. 62/512,828, filed on May 31, 2017.

(51) Int. Cl.
*G21C 17/07* (2006.01)
*G21C 17/108* (2006.01)
*G21C 17/10* (2006.01)
*G01T 3/00* (2006.01)

(52) U.S. Cl.
CPC ........... *G21C 17/108* (2013.01); *G21C 17/10* (2013.01); *G01T 3/00* (2013.01); *G21C 17/07* (2013.01)

(58) Field of Classification Search
CPC ........ G21C 17/07; G21C 17/04; G21C 17/06; G21C 17/108; G21C 17/10; G01T 3/00
See application file for complete search history.

(56) References Cited

U.S. PATENT DOCUMENTS

| 4,774,050 A  * | 9/1988 | Impink, Jr. ............ G21C 17/10 376/216 |
| 5,089,218 A  * | 2/1992 | Gardner ................... G21C 1/09 376/283 |
| 6,492,901 B1 * | 12/2002 | Ridolfo .................. G21C 17/00 340/506 |

(Continued)

FOREIGN PATENT DOCUMENTS

GB          938994 A  * 10/1963  ............... G01T 3/00

OTHER PUBLICATIONS

Van der Ende, B. M., et al. "Stand-off nuclear reactor monitoring with neutron detectors for safeguards and non-proliferation applications." Nature communications 10.1 (2019): 1959. (Year: 2019).*

(Continued)

*Primary Examiner* — Lily C Garner
(74) *Attorney, Agent, or Firm* — Kevin Shipley; Fogler, Rubinoff LLP

(57) ABSTRACT

A system for monitoring fissile material contents inside of a nuclear reactor can include at least a first neutron detector positioned outside a radiation shield and configured to detect a plurality of neutrons originating from the reactor core and having passed through the radiation shield, and configured to generate a first output signal, and a controller communicably linked to the first neutron detector to receive the first output signal and a power output of the nuclear reactor.

9 Claims, 17 Drawing Sheets

(56) References Cited

U.S. PATENT DOCUMENTS

| | | | |
|---|---|---|---|
| 9,208,907 B2* | 12/2015 | Krieg | G21D 3/001 |
| 2015/0092905 A1* | 4/2015 | Lemm | G21C 13/02 |
| | | | 376/395 |
| 2016/0195622 A1 | 7/2016 | Fischbach | |
| 2017/0047132 A1* | 2/2017 | Tsuda | G21C 17/10 |

OTHER PUBLICATIONS

Yamanaka, N., et al. "Application of nuclear pumped laser to an optical self-powered neutron detector." AIP Conference Proceedings. vol. 369. No. 1. AIP, 1996. (Year: 1996).*

NRC definitions. https://www.nrc.gov/reading-rm/basic-ref/glossary/full-text.html. Accessed Aug. 2020.*

Safeguards: Staying Ahead of the Game, IAEA, 2007.

IAEA Department of Safeguards Long-Term R&D Plan, 2012-2023, (STR-375), IAEA, 2013.

A. Bernstein et al., "Nuclear Reactor Safeguards and Monitoring with Antineutrino Detectors", Journal of Applied Physics 91, 4672-4676 (2002).

N.S. Bowden et al., "Experimental Results from an Antineutrino Detector for Cooperative Monitoring of Nuclear Reactors", Nuclear Instruments and Methods in Physics Research A 572, 985-998 (2007).

N.S. Bowden et al., "Observation of the Isotopic Evolution of a Pressurized Water Reactor Fuel Using an Antineutrino Detector", Journal of Applied Physics 105, 064902 (2009).

T. Classen et al., "Development of an Advanced Antineutrino Detector for Reactor Monitoring", Nuclear Instruments and Methods in Physics Research A 771, 139-146 (2015).

A. Bernstein, "Reactor Monitoring with Antineutrinos—A Progress Report", Nuclear Physics B (Proc. Suppl.) 229-232, 101-109 (2012).

Thermal Cross Sections & Resonance Integrals, excerpt from www.nndc.bnl.gov.

G. Consolati et al., "A New Anti-Neutrino Detection Technique Based on Positronium Tagging with Plastic Scintillators", Nuclear Instruments and Methods in Physics Research A 795, 364-369 (2015).

D. Asner et al., "Method of Fission Product Beta Spectra Measurements for Predicting Reactor Anti-Neutrino Emission", Nuclear Instruments and Methods in Physics Research A 776, 75-82 (2015).

P. Huber et al., "Precision Spectroscopy with Reactor Antineutrinos", Physical Review D 70, 053011 (2004).

S. Glasstone et al., "Nuclear Reactor Engineering: Reactor Design Basics", Fourth Edition, vol. 1, pp. 103-106, Springer Science + Business Media: Dordrecht (1994).

J.S. Beaumont et al., "High-Intensity Power-Resolved Radiation Imaging of an Operational Nuclear Reactor", Nature Communications 6, 8592 (2015).

A.M. Dias et al., "Determination of the Powder Density Distribution in a PWR Reactor Based on Neutron Flux Measurements at Fixed Reactor Incore Detectors", Annals of Nuclear Energy 90, 148-156 (2016).

D.G. Madland, New Fission-Neutron-Spectrum Representation for ENDF, LA-9285-MS, Apr. 1982.

T.C. Leung, "Validation of Fuel Burnup for the NRU Research Reactor", Transactions of the American Nuclear Society, vol. 109, pp. 1487-1489, Washington, D.C., Nov. 10-14, 2013.

V. Bulaevskaya et al., "Detection of Anomalous Reactor Activity Using Antineutrino Count Evolution Over the Course of a Reactor Cycle", Journal of Applied Physics 109, 114909 (2011).

* cited by examiner

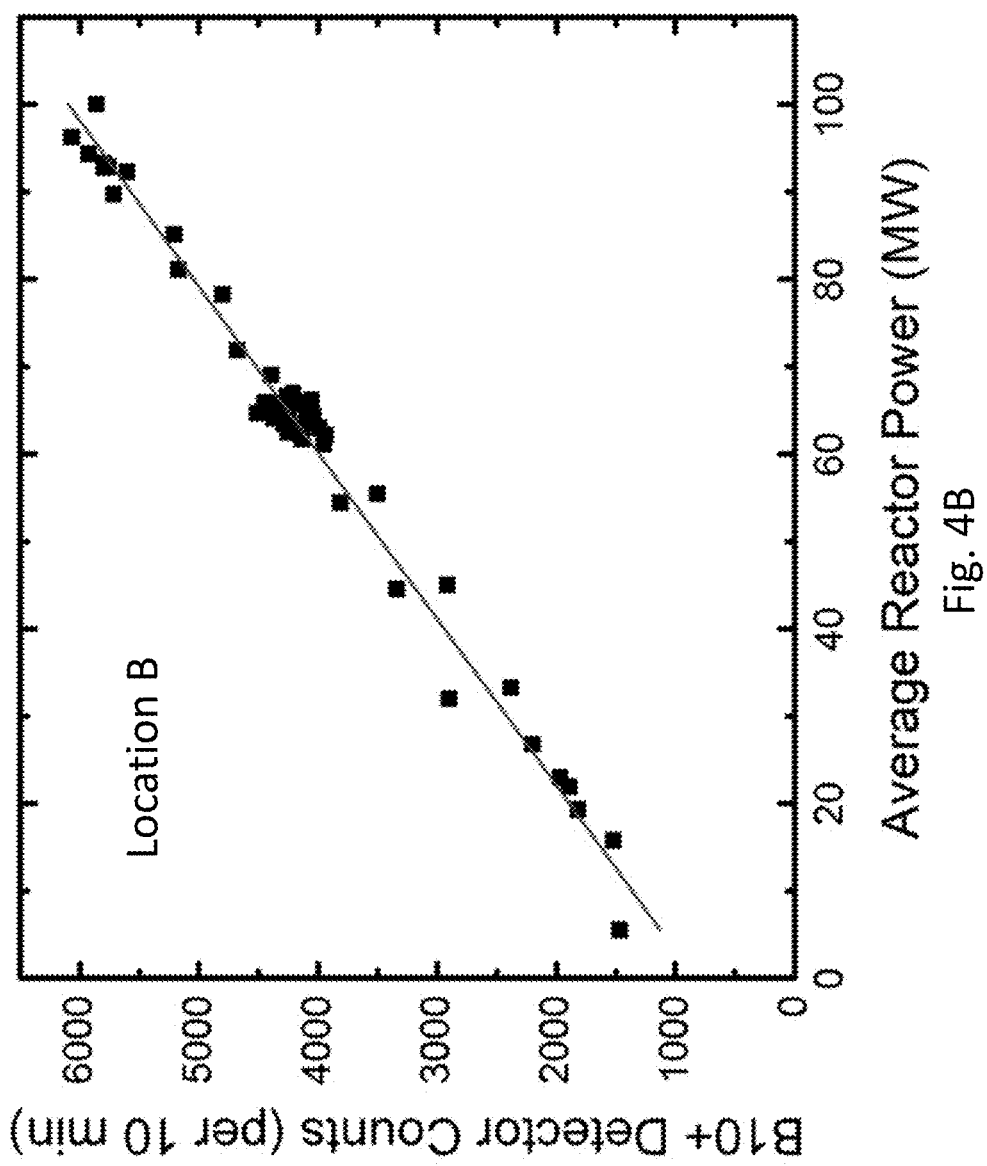

SYSTEM AND METHOD FOR STAND-OFF MONITORING OF NUCLEAR REACTORS USING NEUTRON DETECTION

CROSS-REFERENCE TO RELATED APPLICATIONS

This application claims the benefit U.S. Provisional Application No. 62/512,828 filed May 31, 2017 and entitled System and method for STAND-OFF MONITORING OF NUCLEAR REACTORS USING NEUTRON DETECTION, the entirety of which is incorporated herein by reference.

FIELD

The present subject matter of the teachings described herein relates generally to systems for monitoring ionizing radiation and methods of using such systems.

BACKGROUND

Nuclear reactor safeguards measures are used to verify that nuclear material is not diverted from peaceful uses. Scenarios for diversion of nuclear material from peaceful uses can take a number of forms, such as undeclared changes in the rate of plutonium production within a reactor, undeclared reductions in the level of irradiation of fuel to facilitate later removal of fissile material, or the actual diversion of fissile material from the reactor. Safeguards monitoring systems are currently in place at some of the world's power reactors, at research reactors worldwide, and at other nuclear facilities that fall under the International Non-Proliferation Treaty. Existing safeguard systems tend to be indirect means that do not involve the direct measurement of the fissile isotopic content of the reactor, but instead consist primarily of semi-annual or annual inspections of coded tags and seals placed on fuel assemblies, and measures such as video surveillance of spent fuel cooling ponds and the like. Direct measurements are typically made off-line, before or after fuel are introduced into the reactor. Real-time, online quantitative measurements of reactor core power and isotopic composition have been demonstrated in more recent times with relatively large and relatively expensive anti-neutrino detectors. This technique is generally based upon variations in detectable antineutrino yield from differing isotopes. However, count rates of anti-neutrino detectors tend to be relatively low, and may have a relatively very high background noise level.

US patent publication no. 2016/0195622 relates to an apparatus for detecting the presence of a nuclear reactor by the detection of antineutrinos from the reactor that can include a radioactive sample having a measurable nuclear activity level and a decay rate capable of changing in response to the presence of antineutrinos, and a detector associated with the radioactive sample. The detector may be responsive to at least one of a particle or radiation formed by decay of the radioactive sample. A processor associated with the detector can correlate rate of decay of the radioactive sample to a flux of the antineutrinos to detect the reactor.

A publication, J. S. Beaumont et al., Nature Communications, vol. 6, article no. 9592, describes the use of neutron and gamma radiation imaging outside of reactor shielding for the purpose of diagnosing the neutron distribution in a nuclear reactor, for ensuring safe and efficient burnup of the reactor fuel. In this publication, no method is developed for monitoring reactor core fuel inventory for the purposes of nuclear material safeguards.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In accordance with one aspect of the teachings described herein, a system for monitoring at stand-off distance a nuclear reactor having a reactor core containing nuclear fuel material and a radiation shield, may include at least a first neutron detector positioned outside the radiation shield and configured to detect a plurality of neutrons originating from the reactor core and having passed through the radiation shield, and configured to generate a first output signal. The system can also include a controller communicably linked to the first neutron detector to receive the first output signal and a power output of the nuclear reactor. The controller may be configured to determine aberrant changes in isotopic composition of the nuclear fuel in the reactor core, based on deviations from accepted baseline behavior in the output signal and the power output.

The system may optionally include a second neutron detector positioned outside the radiation shield and spaced apart from the first neutron detector. The second neutron detector may be configured to detect the plurality of neutrons originating from the reactor core and having passed through the radiation shield, and may be configured to generate a second output signal. The controller may be communicably linked to the second neutron detector to receive the second output signal and determine an isotopic concentration of the nuclear fuel material in the reactor core based on the first output signal, the second output signal and the power output.

The controller may be operable to compare the first output signal to a pre-determined, expected value of neutron flux per unit reactor power and generate an alert if the first output signal differs from the expected value of neutron flux per unit reactor power.

The expected neutron flux per unit reactor power may include at least one of a simulated neutron flux per unit reactor power and a base line neutron flux per unit reactor power for the reactor. The base line neutron flux per unit reactor power may be an empirically generated value of neutron flux per unit reactor power obtained by monitoring the reactor with the system during a calibration session when the reactor is operating under known conditions and storing the measured neutron flux per unit reactor power in the controller.

The first neutron detector and second neutron detector may be large-area thermal neutron detectors or fast neutron detectors, or a combination of each.

The system may include a first moderator surrounding the first neutron detector, between the detector and the reactor radiation shield. The first moderator may be configured to convert at least some of the plurality of neutrons from fast neutrons to thermal neutrons before the plurality of neutrons reaches the first neutron detector. The moderator may be formed from high density polyethylene, and optionally may have a thickness of between about 0.5 inches and about 3 inches, or about 1 inch, in a direction that the plurality of neutrons pass through the first moderator. The moderator also may optionally employ materials containing hydrogen, deuterium, beryllium, and carbon.

In accordance with another broad aspect of the teachings described herein, a method of monitoring the operating conditions of a nuclear reactor having a reactor core containing nuclear fuel material and a radiation shield, may include the steps of:

a) positioning at least a first neutron detector at a first stand-off location relative to the reactor, wherein the first neutron detector is outside the radiation shield;

b) detecting a plurality of neutrons that originated within the reactor core and have passed through the radiation shield using the first neutron detector and transmitting a first output signal to a system controller;

c) monitoring the reactor power output with system controller; and d) comparing the first output signal to an expected neutron flux per unit reactor power for the reactor and generating a corresponding controller output signal.

Step a) may include positioning a second neutron detector at a second stand-off location relative to the reactor. The second neutron detector may be outside the radiation shield and may be spaced apart from the first neutron detector. The method may also include detecting a plurality of neutrons that originated within the reactor core and have passed through the radiation shield, using the second neutron detector and transmitting a second output signal.

Step d) may include comparing the first output signal with the second output signal to identify differences between the first output signal and the second output signal.

The method may include comparing at least one of the first output signal and the second output signal to a predetermined, expected neutron flux value per unit reactor power and generating an alert if the first output signal differs from the expected value of neutron flux per unit reactor power The expected neutron flux may include at least one of a calculated neutron flux and an empirically measured base line neutron flux for the reactor.

The base line neutron flux may be an empirically generated neutron flux value obtained by monitoring the reactor with the system during a calibration session when the reactor is operating under known conditions and storing the measured neutron flux in the controller.

The method may include moderating the plurality of neutrons that originated within the reactor core and have passed through the radiation shield using a moderator prior to the plurality of neutrons reaching the first neutron detector, whereby at least a portion of the neutrons reaching the first neutron detector are thermal neutrons.

DRAWINGS

The drawings included herewith are for illustrating various examples of articles, methods, and apparatuses of the teaching of the present specification and are not intended to limit the scope of what is taught in any way.

Figure 2:
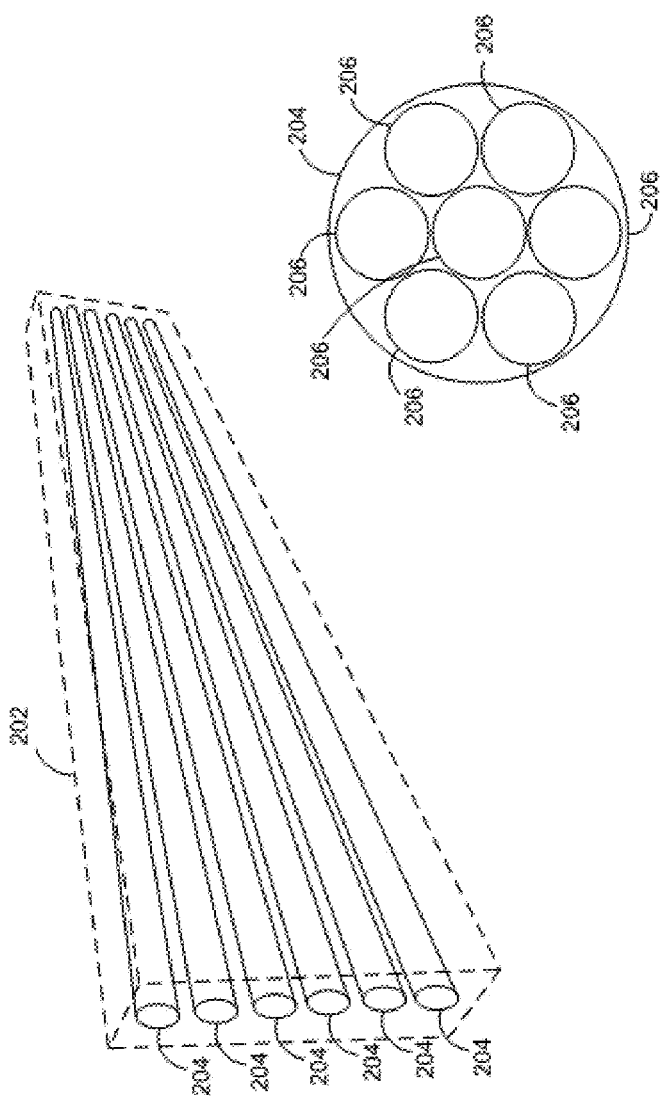
FIG. 2 is a schematic representation of one example of a neutron detector.
Figure 3:
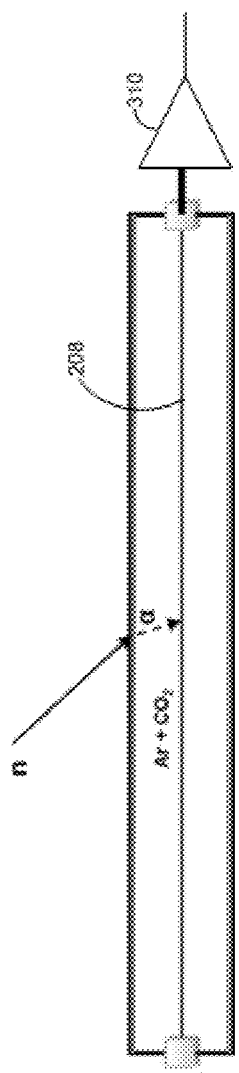
Figure 4:
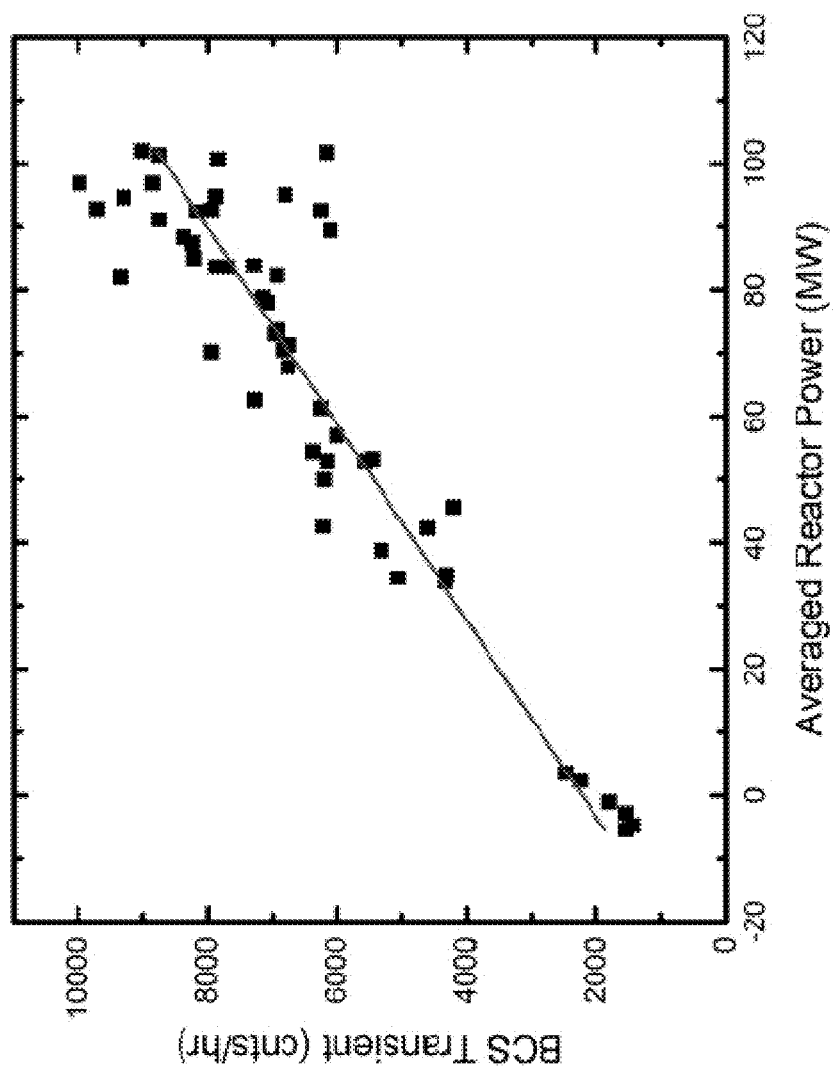
Figure 4A:
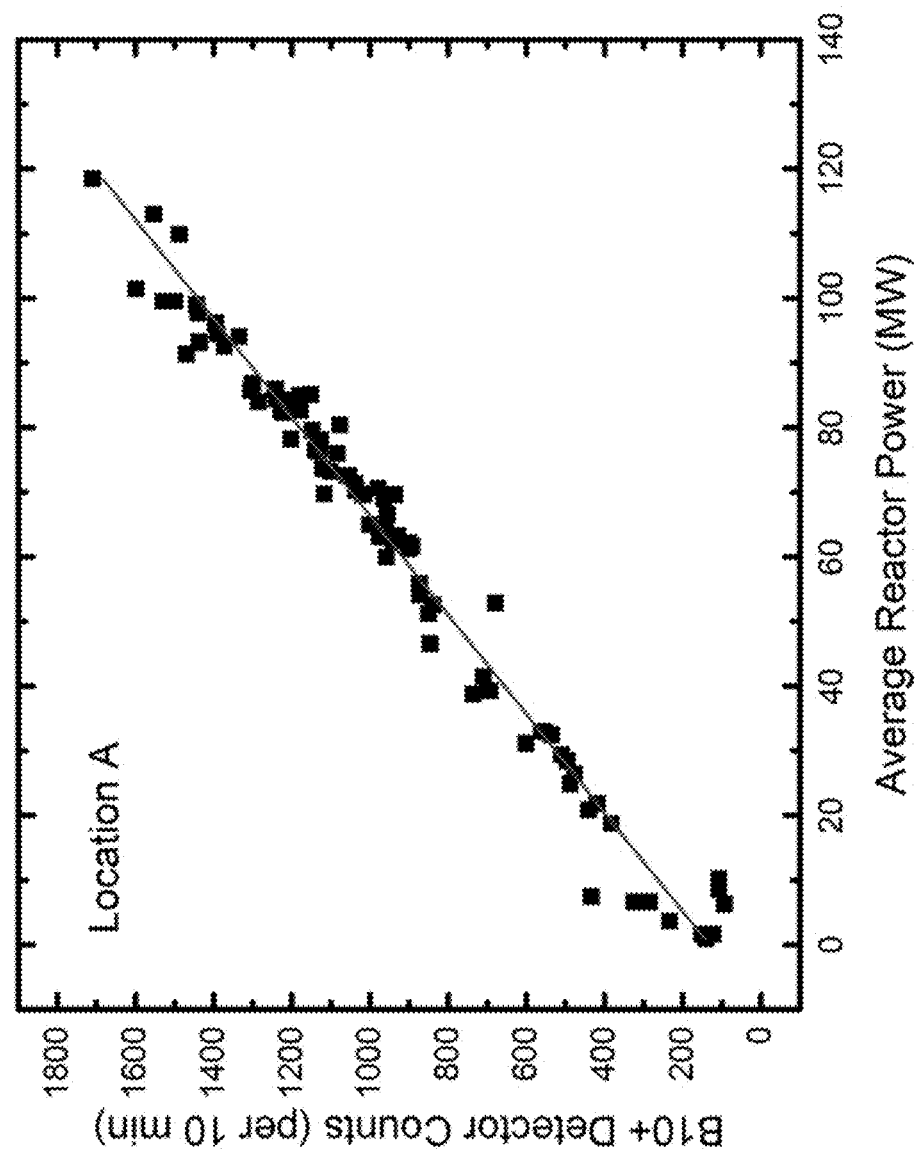

FIG. 3 another representation of the neutron detector of FIG. 2;

FIG. 4 is a plot showing a correlation between detector count rate of a neutron detector and thermal reactor power in accordance with at least one embodiment;

FIG. 4A is a plot showing a correlation between detector count rate of a neutron detector and thermal reactor power in accordance with at least one embodiment;

FIG. 4B is a plot showing a correlation between detector count rate of a neutron detector and thermal reactor power in accordance with the same embodiment as FIG. 4A, but at a different location.

Figure 5:
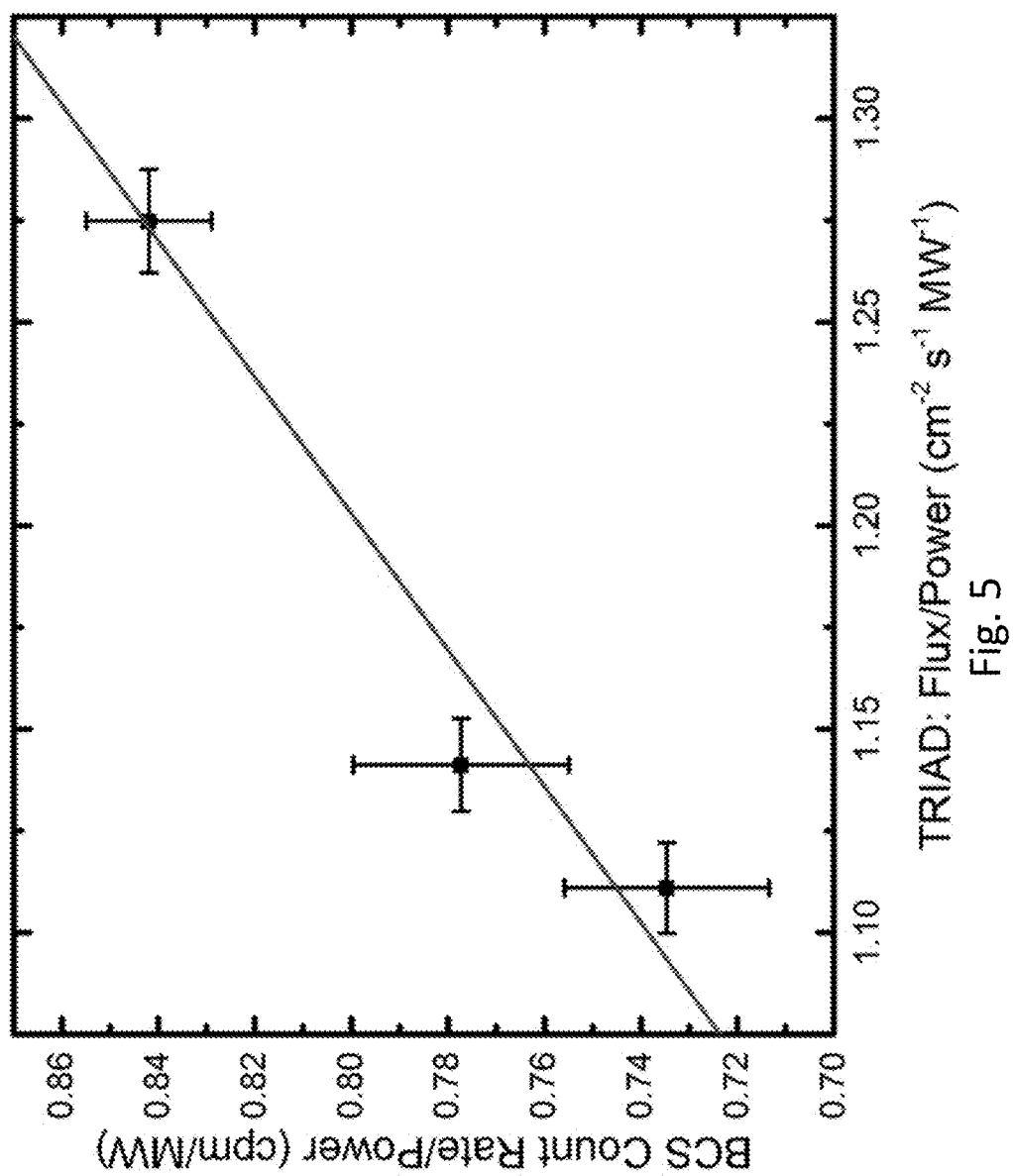
Figure 6:
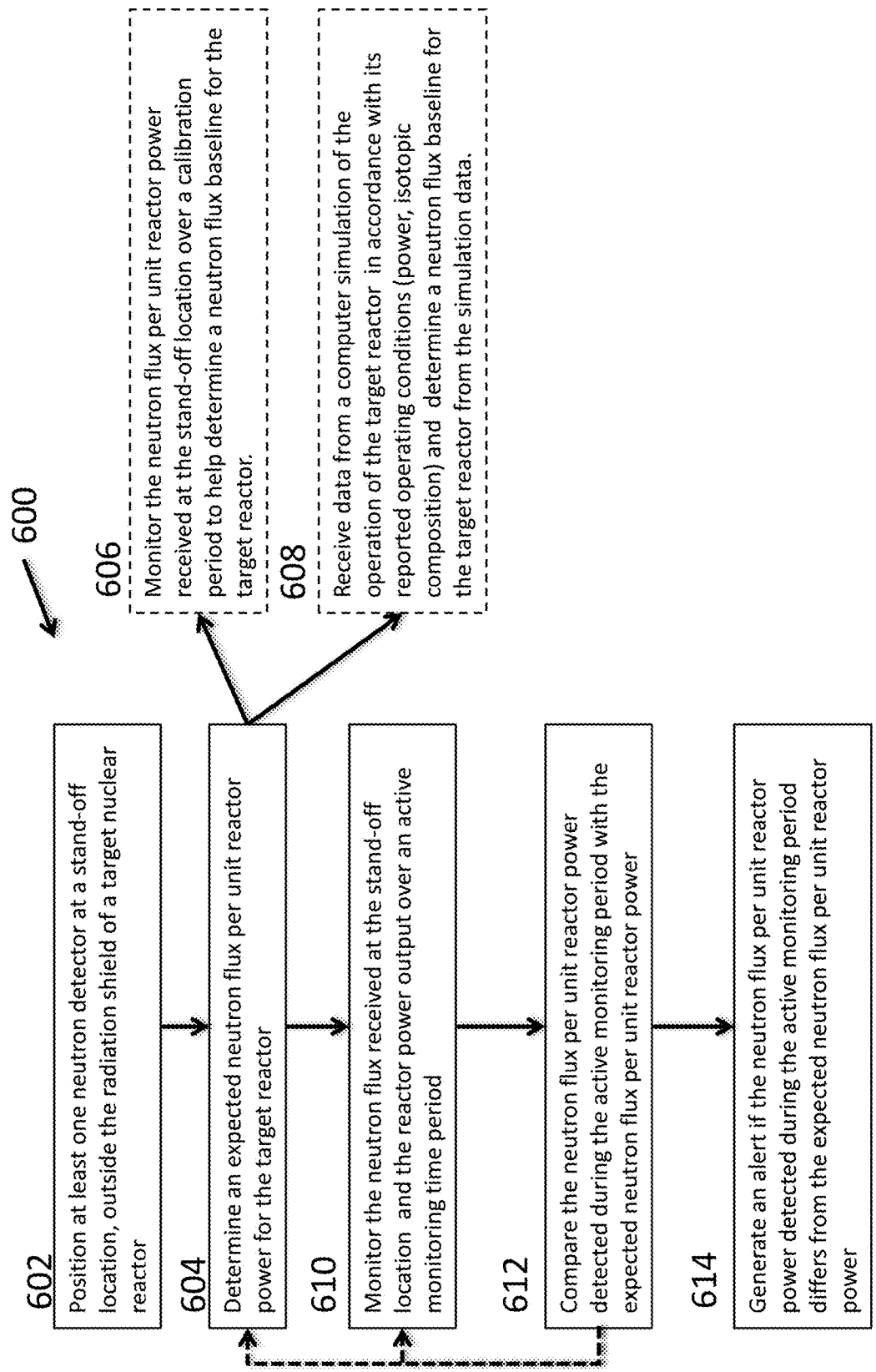
Figure 7:
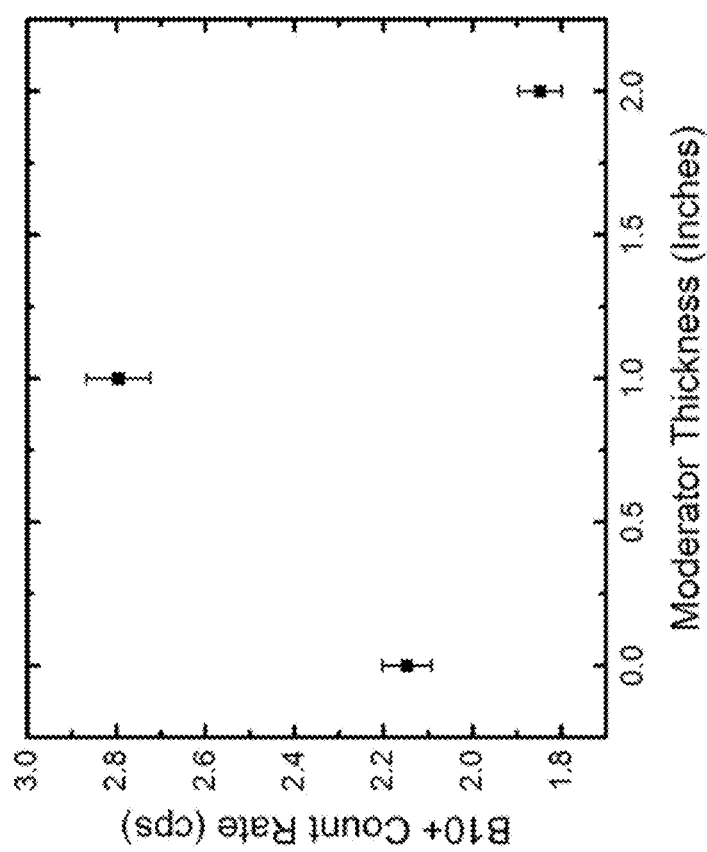
Figure 8:
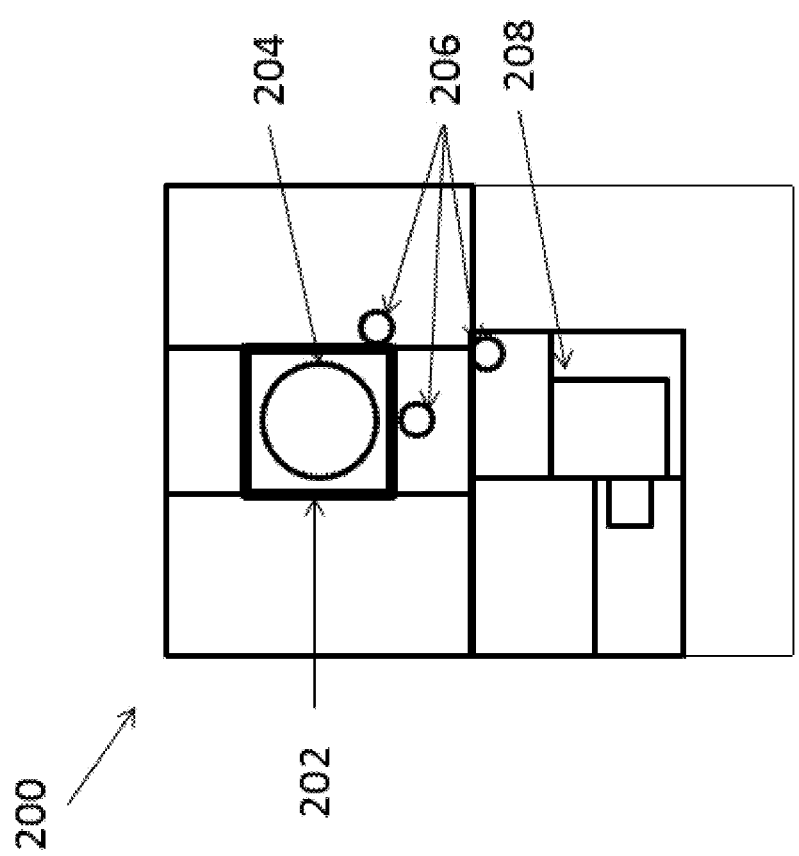

FIG. 5 is a plot showing measured and simulated detector count in accordance with at least one embodiment of a monitoring system;

FIG. 6 is a flowchart of a method for stand-off monitoring of a nuclear reactor based on neutron detection in accordance with at least one embodiment;

FIG. 7 is a plot of detector count rate vs moderator material thickness for a given neutron detector;

FIG. 8 is a top-down view of a schematic representation of stage 2 of a simulation model. The circles show the detector locations.

Figure 10:
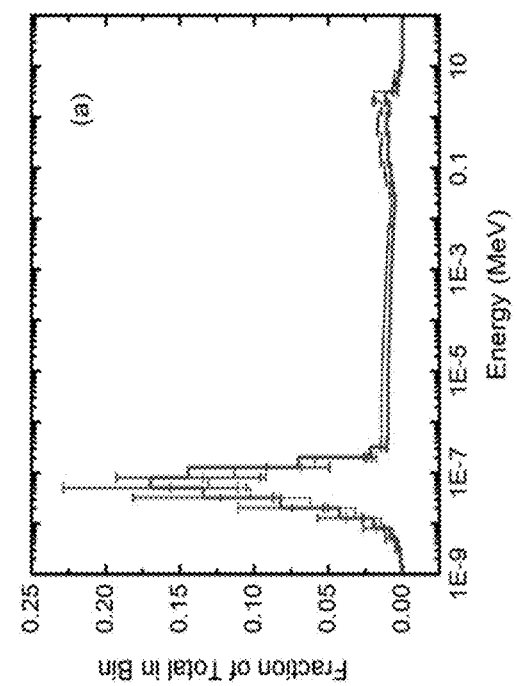
Figure 9:
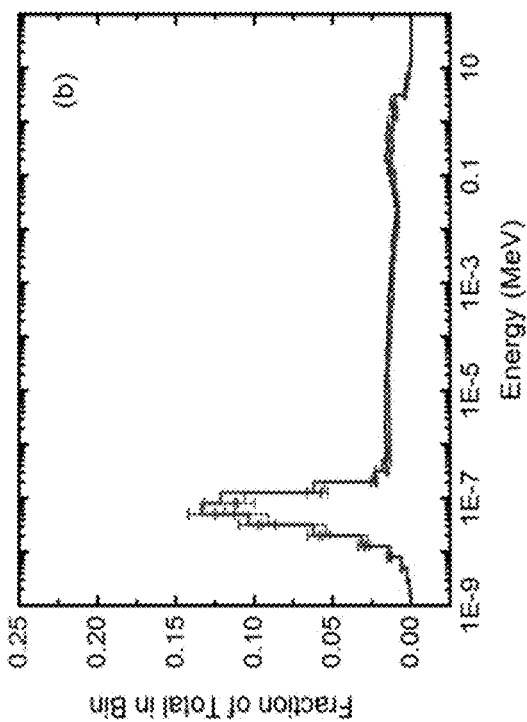

FIGS. 9 and 10 are plots showing calculated neutron energy spectra on the south side of ZED-2, and the east side of ZED-2, respectively. Simulated LEU core data is shown using a thin line, and simulated NU core data is shown using the thicker line.

Figure 11:
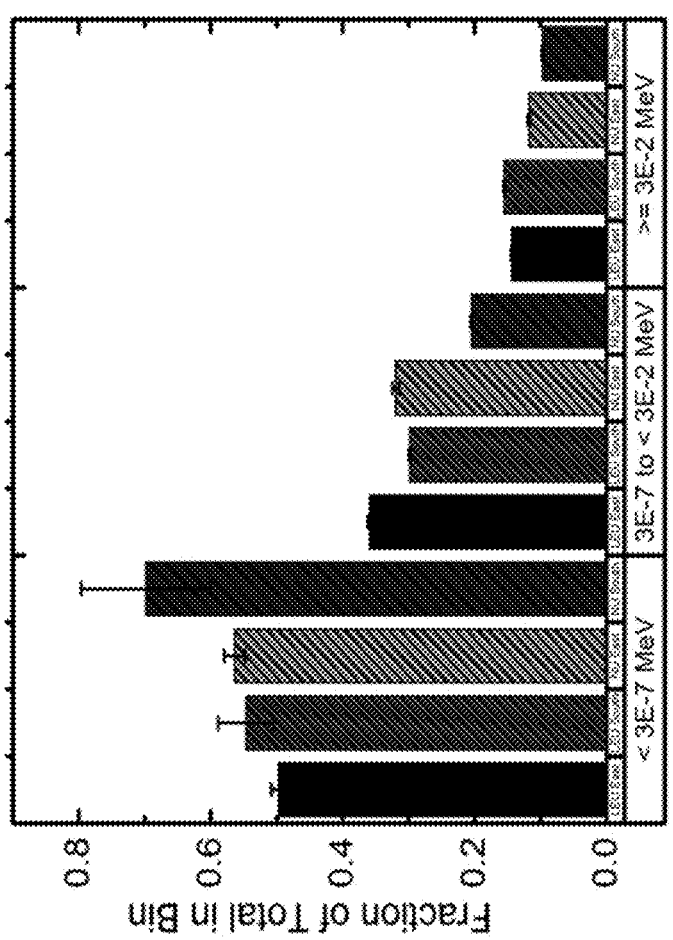
Figure 12:
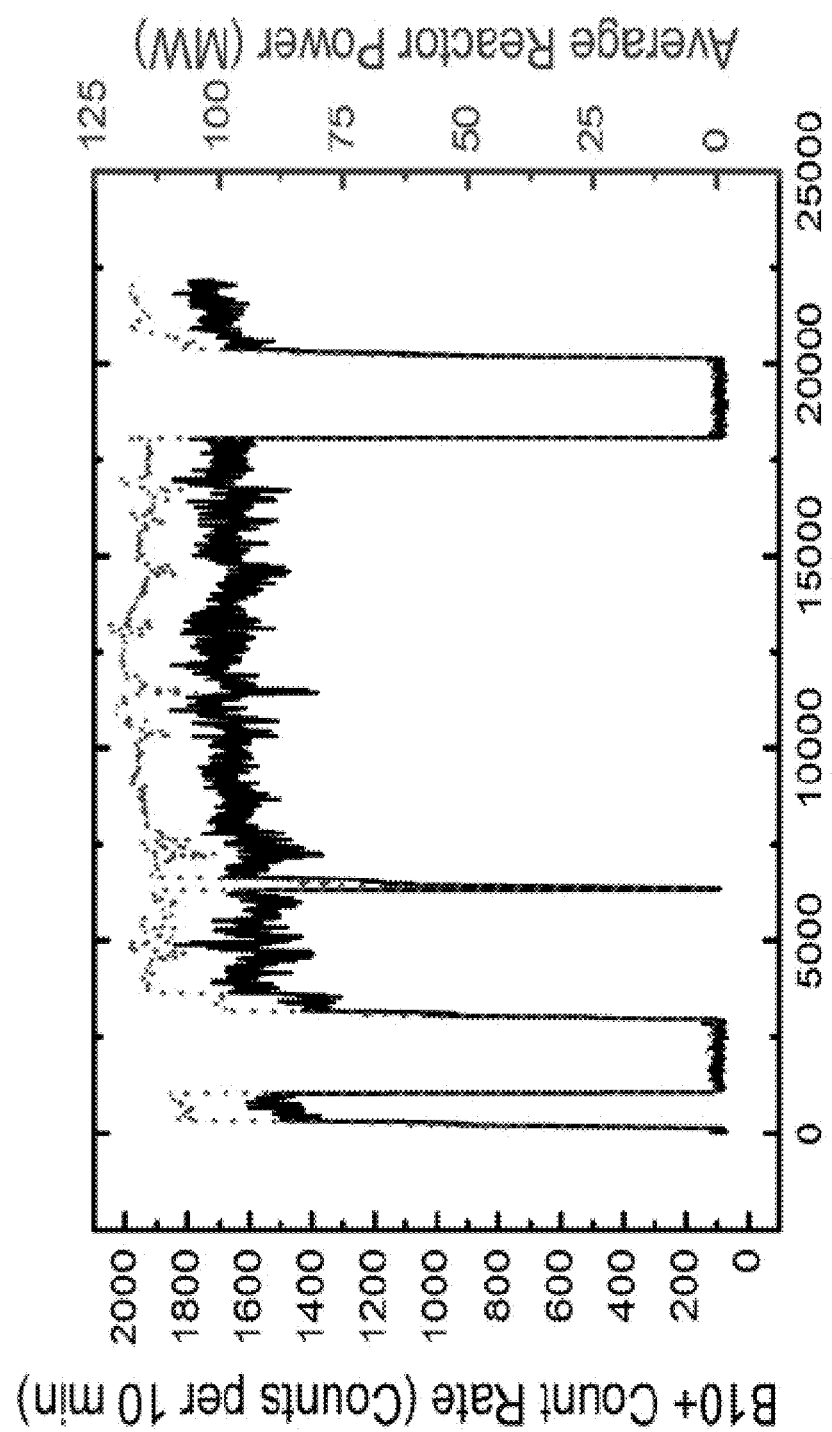
Figure 13:
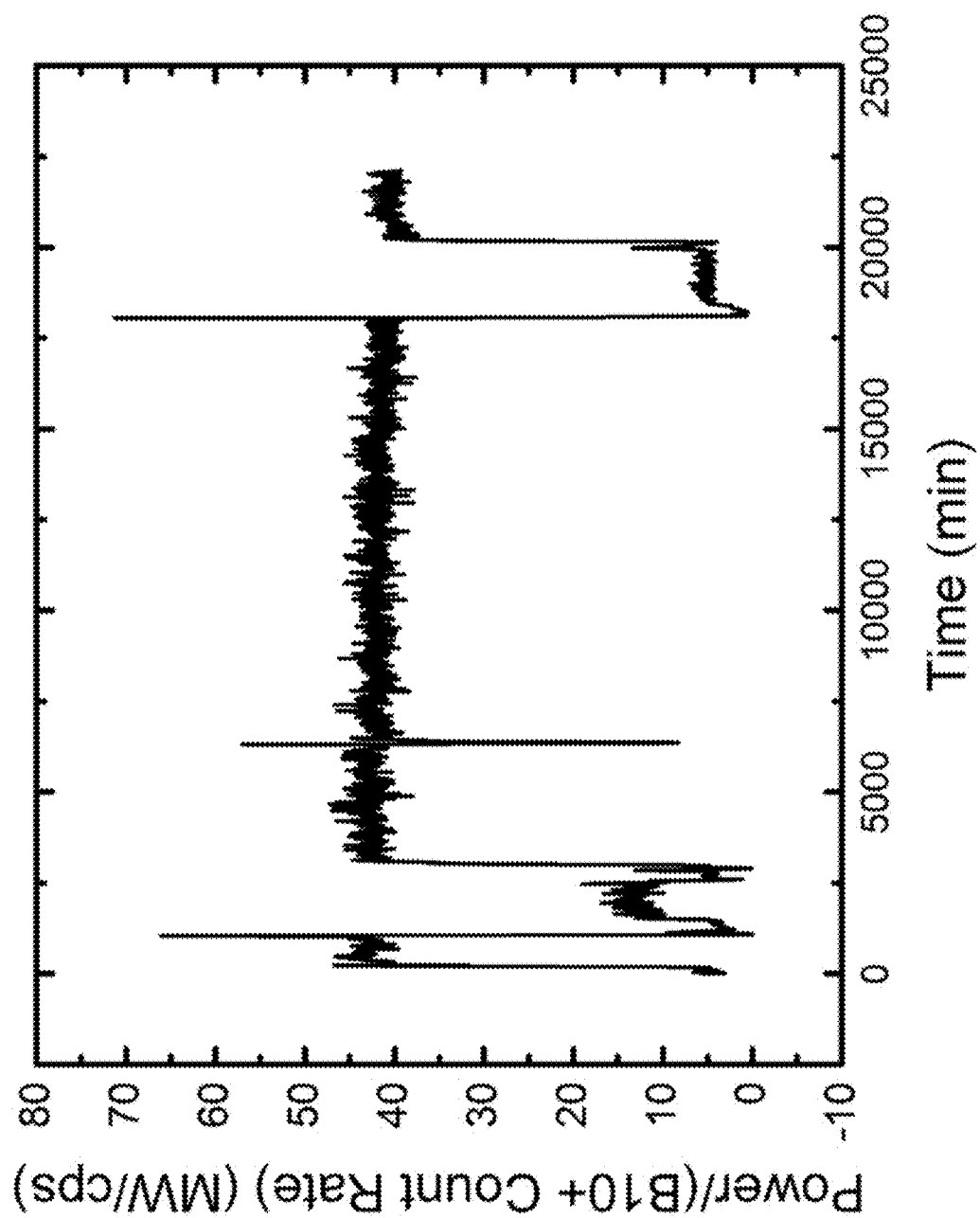
Figure 14:
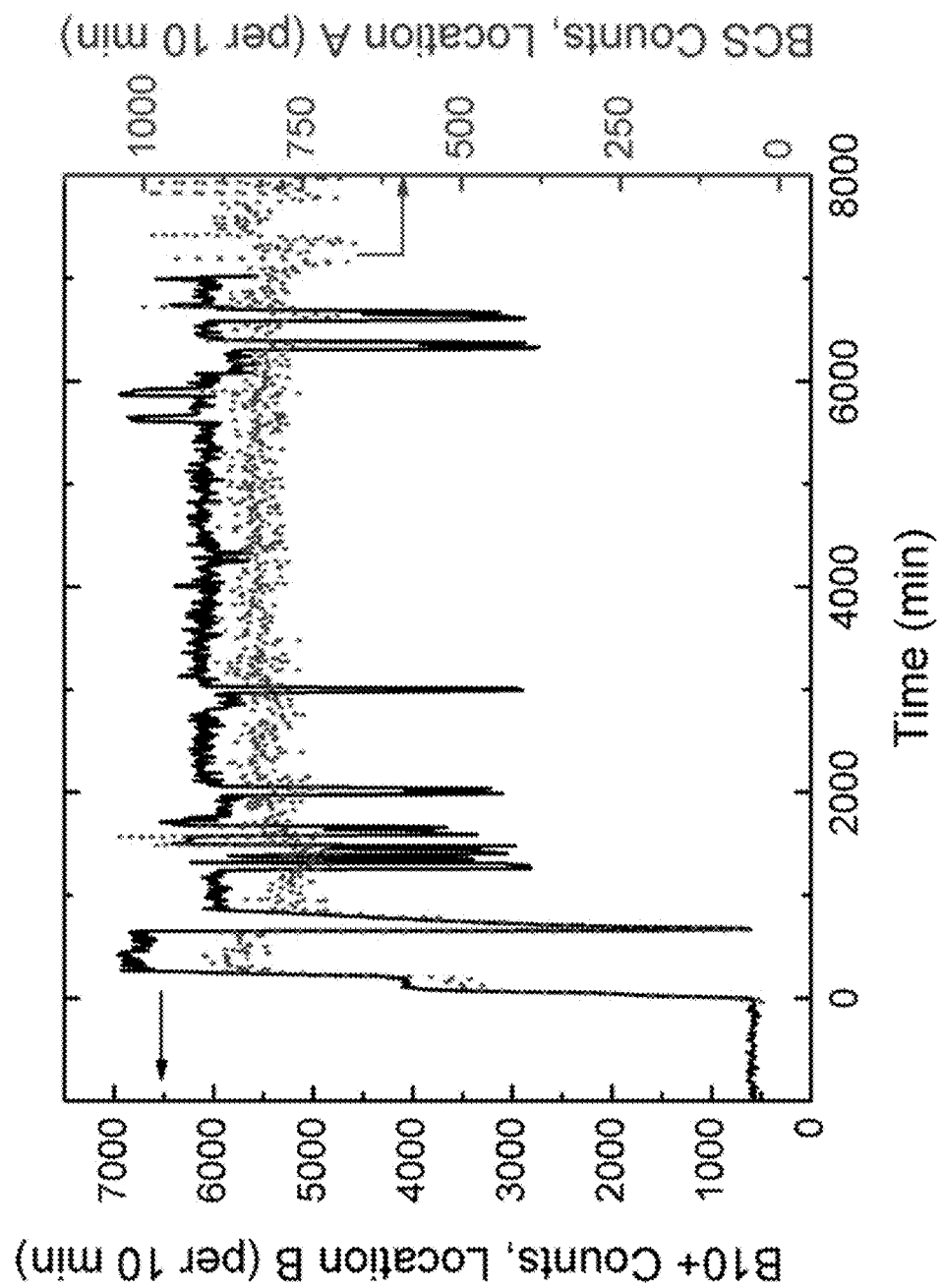
Figure 15:
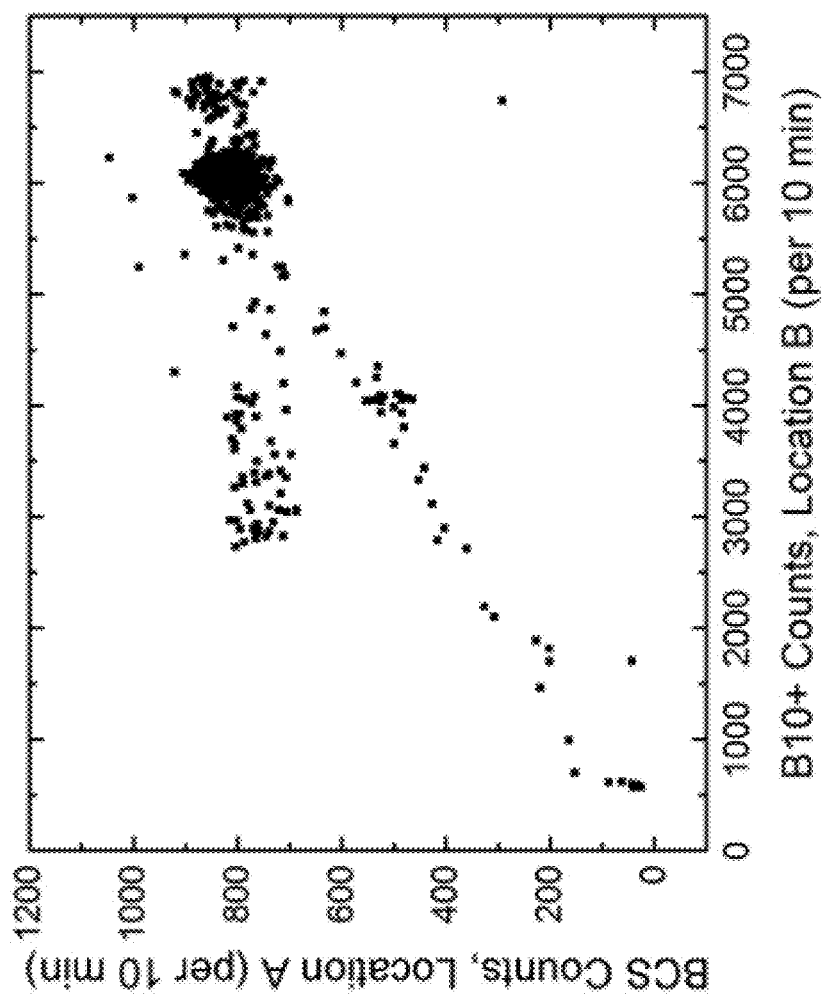
Figure 16:
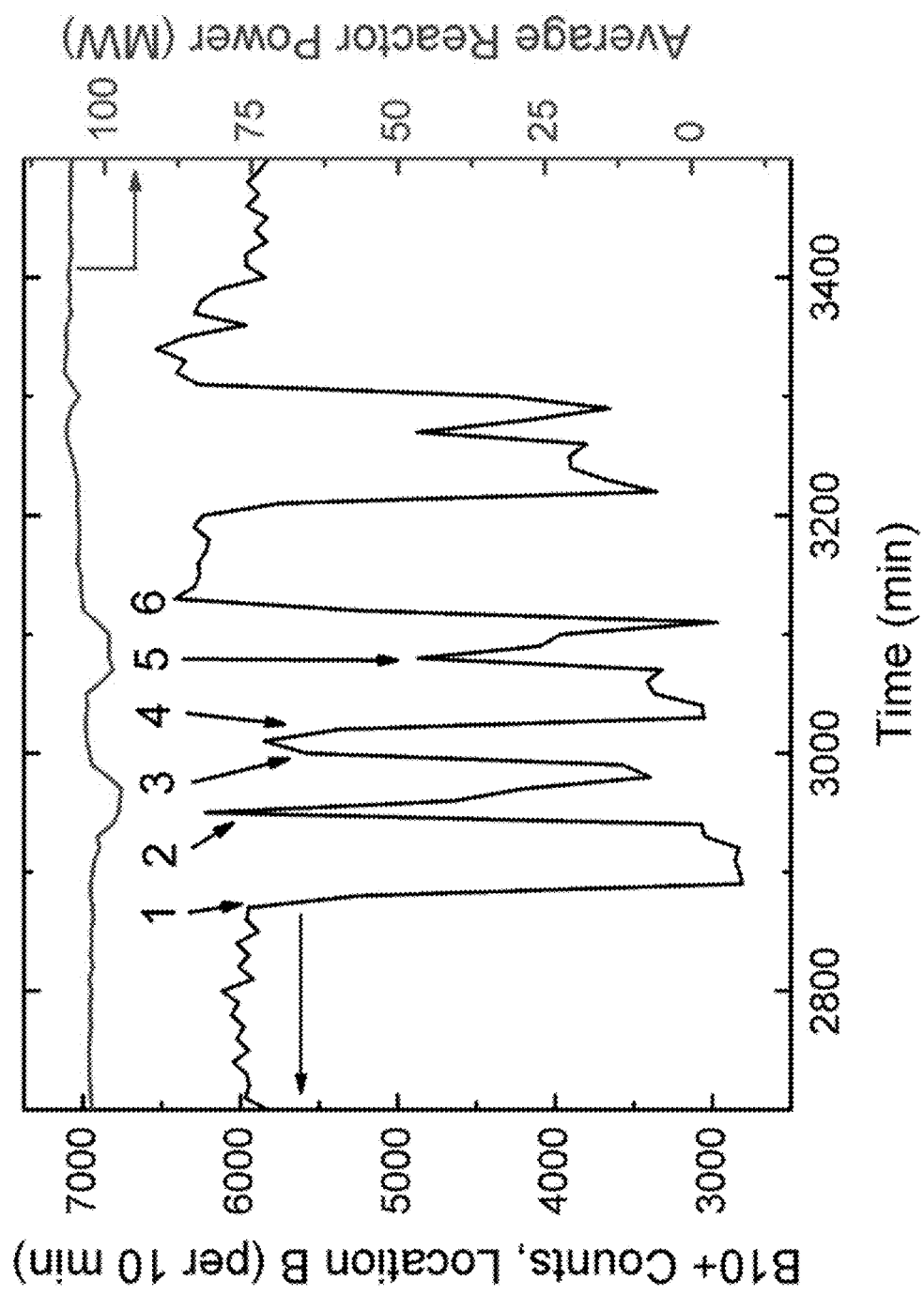

FIG. 11 is a plot showing the integral sums of energy spectra regions from FIGS. 9 and 10. Black columns correspond to East Side of the reactor for a LEU core, columns with dense stripes is for the South Side of the reactor for a LEU core, columns with moderate density stripes is for the East Side of the reactor for a NU core, and columns with sparse stripes is for the South Side of the reactor for a NU core;

FIG. 12 is a plot showing B10+ detector count rate (solid curve) and average reactor power (dotted curve) versus time at Location A;

FIG. 13 is a plot showing a ratio of reactor power to B10+ detector count rate versus time at Location A, using the data shown in FIG. 12;

FIG. 14 is a plot showing a B10+ detector count rate at location B, and simultaneous BCS detector count rate at Location A, versus time;

FIG. 15 is plot showing the B10+ detector count rate at location B versus the simultaneous BCS detector count rate at Location A; and FIG. 16 is a plot showing an example of how the B10+ detector count rate varies with online refueling activities, in which (1) fuel rod flask parks on top of reactor, (2) fuel rod taken up by flask, rapidly emitting decay products, (3) flask moves away from top of reactor for a break, (4), flask moves back onto top of reactor, (5) fuel rod taken up by flask, followed by rapid decay, (6) flask moves away from top of reactor.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Reactor safeguards regimes, for detecting undeclared nuclear material and for monitoring nuclear reactors, can be generally intended to detect illicit or suspicious uses of reactor facilities. Examples of illicit use could include unauthorized changes in the rate of plutonium production within a reactor, a reduction in the level of irradiation of fuel to facilitate later removal of fissile material, or the actual diversion of fissile material from the reactor. Some versions of safeguard monitoring systems are currently in place at about half of the world's power reactors, and at hundreds of research reactors worldwide. These are largely safeguarded by means that do not involve the ongoing direct measurement of the fissile isotopic content of the reactor or the reactor core power, but instead consist of semi-annual or annual inspections of coded tags and seals placed on fuel assemblies, and measures such as video surveillance of spent fuel cooling ponds.

Nuclear reactor safeguard measures may be used to help verify that nuclear material is not diverted from peaceful uses. Scenarios for diversion of nuclear material from peaceful uses can take a number of forms, including undeclared changes in the rate of plutonium production within a reactor, undeclared reductions in the level of irradiation of fuel to facilitate later removal of fissile material, or the actual diversion of fissile material from the reactor. Safeguards monitoring systems are currently in place at some power reactors and research reactors worldwide. These reactors are largely safeguarded by indirect means that do not involve the direct measurement of the fissile isotopic content of the reactor, but instead consist primarily of semi-annual or annual inspections of coded tags and seals placed on fuel assemblies, and measures such as video surveillance of spent fuel cooling ponds. Direct measurements may be typically made off-line, before or after fuel is introduced into the reactor.

There are however, some systems that attempt to provide real-time quantitative measurements of reactor core power and isotopic composition may help facilitate enhanced monitoring of nuclear reactors. One such system utilizes anti-neutrino detectors. Anti-neutrinos can be produced in large quantities as by products within the nuclear reactor core of fission reactions. The probability of anti-neutrinos interacting with material is relatively low, which means that substantially all of the anti-neutrinos created can the stream out of the nuclear reactor core. The fission yield of the reactor is generally proportional to the reactor power, and therefore so is the anti-neutrino yield. Anti-neutrino yield can also vary with fissioning isotopes, such that anti-neutrino detectors may be designed to follow changes in reactor core isotopic composition through the reactor fuel cycle.

However, because anti-neutrinos are weakly-interacting materials, anti-neutrino detectors typically require a relatively large detection volume, typically on the scale of a few cubic meters. The detectors typically weigh on the scale of a few tonnes. Their antineutrino detection rates tend to be relatively low, and the antineutrino signal is typically discriminated against a large amount background noise induced by other particles with relatively higher interaction probabilities. Sophisticated veto and discrimination strategies and signal processing systems are required for extracting the true antineutrino signal, adding to the complexity of the overall detector system. Detectors of this size and complexity may not be suitable for some reactor monitoring systems, and/or may be difficult to integrate into existing reactor facilities and the like. In some environments, the relatively low signal-to-noise ratio of these systems can reduce the overall sensitivity of the monitoring systems. Constructing and installing anti-neutrino monitoring systems may also be relatively costly.

In contrast to existing monitoring systems, a new nuclear monitoring system has been created that may help facilitate real-time, ongoing direct measurement of the fissile isotopic content of the reactor or the reactor core power using neutron detectors that are positioned in suitable locations around a nuclear reactor, rather than anti-neutrino detectors. Specifically, the neutron detectors are positioned outside the reactor core and outside the standard radiation shielding material that surrounds a reactor core, and are an example of a so called stand-off monitoring system in which the detectors are positioned outside the stand-off distance surrounding the nuclear reactor. For the purposes of this description, a standoff distance can be any suitable distance from a nuclear reactor that is outside the radiation shielding of the reactor core, and may be between 10 m and about 1000 m or more from the reactor core, and may be between about 20 m and about 500 m, and between about 50 m and about 200 m or optionally within 100 m outside the boundary of the radiation shielding of the reactor core. In some configurations, the neutron detectors may be positioned outside the radiation shielding layer and within the surrounding reactor building, and in other configurations the neutron detectors may be located outside the reactor building, and optionally may be in a separate building, trailer, enclosure or other suitable location.

While it is understood that anti-neutrino particles escape from the reactor core and are present outside the radiation shielding layer of a nuclear reactor, it is not obvious that neutrons would be present in sufficient quantities to make meaningful measurements of the reactor condition(s) outside the radiation shielding layer of a nuclear reactor, in part because the radiation shielding layer in a fission-based nuclear reactor is intended to prevent the escape of neutrons from the reactor core.

Prior to developing the new monitoring systems described herein, it was unknown if positioning neutron detectors outside the stand-off perimeter to monitor the fissile isotopic content of the reactor or the reactor core power would allow for the creation of an acceptable monitoring system for a variety of reasons, including that It was not clear a priori that there would be sufficient neutron flux escaping nuclear reactor shielding that could be detected at stand-off distances from the reactor, it was not clear a priori that the neutron detection signal acquired outside of nuclear reactor shielding would be sensitive to the reactor core's isotopic fuel composition, and it was not clear a priori how environmental influences on neutron detection rate might be overcome. However, despite these apparent challenges, it was surprisingly discovered that neutron detectors can be utilized as sensors in a stand-off reactor monitoring system, and that the signals received from the neutron detectors could be used to detect differences in the fissile isotopic content of the reactor or the reactor core power over time.

The inventors discovered that neutron detection at stand-off distances using an array of large-area neutron detectors at various locations within and around a reactor facility could potentially provide a viable, economical, and relatively more compact alternative to anti-neutrino detectors.

As described in more detail herein, neutron detection may be able provide a system with an acceptable signal to background, and the results of detection may be sensitive to the differences in isotopic-dependent properties of the fuel within the reactor including the energy released per fission, and the cross-section for fission. Isotopic properties for U-235, U-238 and Pu-239 are summarized in Table 1.

TABLE 1

| PROPERTY | U-235 | U-238 | Pu-239 | Pu-241 |
|---|---|---|---|---|
| NUMBER OF ANTINEUTRINOS ABOVE 1.8 MeV PER FISSION [10] | 1.921 ± 0.019 | 2.381 ± 0.020 | 1.451 ± 0.021 | 1.831 ± 0.019 |
| THERMAL NEUTRON INDUCED FISSION CROSS SECTION AT 433K [7] | 399.4 ± 1.1 barns | 0.000002 barns | 512.8 ± 2.0 barns | 693.1 ± 6.2 barns |
| THERMAL ENERGY PER FISSION [10] | 201.7 ± 0.6 MeV | 205.0 ± 0.9 MeV | 210.0 ± 0.9 MeV | 212.4 ± 1.0 MeV |

Comparing the properties of the neutrons measured using the system(s) described herein, in view of these isotopic-dependent properties and optionally with reference to other reactor parameters including power output, may help facilitate detection of changes in isotopic composition of the fuel in a reactor core, while monitoring the power and escaping neutron output of the reactor. One potentially advantageous economical aspect of the systems described herein that use neutron detectors for the purpose of reactor safeguard measurements, may be that an array of neutron detectors can be deployed at different locations around a reactor to obtain readings of the neutron flux per unit reactor power at each location. The system can then monitor each of these discrete readings over time. If an event is recorded on one detector (for example a spike in neutron flux per unit reactor power), the readings of other detectors taken at the same time can be queried for evidence of similar event. If the same phenomenon is detected on multiple detectors, it may suggest that the phenomenon originated from within the reactor. In contrast, if an event is detected at one detector but not others, it may suggest a background or environmental occurrence that is localized to one of the detectors and is not necessarily indicative of a change in the reactor conditions.

Optionally, the readings from the multiple neutron detectors may be coordinated, e.g. time-stamped, so as to help facilitate discrimination against either inadvertent or malicious interferences that might cause variations in individual neutron detection rates.

As compared with anti-neutrino detectors that could be used for reactor monitoring, neutron detectors may tend to be relatively smaller. Using relatively smaller, lightweight detectors may help facilitate transportation and installation of the neutron detectors. This may be helpful if the system is configured as a portable system that can be transported, and set-up around, multiple different nuclear reactors. Providing relatively small neutron detectors may also help facilitate placing the neutron detectors in desired locations around a given nuclear reactor, and may make the system more flexible in terms of physical arrangement than a comparable anti-neutrino monitoring system.

As compared to anti-neutrinos, neutrons interact with materials far more readily and may be relatively easier to detect. That is, the event rate for anti-neutrino detectors may be one or more orders of magnitude lower than the event rate for a neutron detector suitable for use with the systems described herein. As such, the inventors have discovered that a relatively lower flux of neutrons escaping the shielded reactor core (as compared to the flux of escaping anti-neutrinos) may be detected in quantities that are sufficient for use with the systems and methods described herein.

Some of the teachings described herein are based on the understanding that the number of neutrons detected, $n_{det}$, is proportional to the population of neutrons $n_{pop}$ in the reactor core, $$n_{det} \propto n_{pop} \propto \frac{\langle \phi \rangle}{\langle v \rangle} V \qquad (1)$$

where $\langle \phi \rangle$ is the average neutron flux in the reactor core, $\langle v \rangle$ is the average speed of the neutrons in the reactor core, and V is the volume of the reactor core. Further, as can be seen most clearly in the case of a thermal neutron reactor where most fissions occur in the thermal energy range, the average neutron flux $\langle \phi \rangle$, the average fission cross section $\langle \sigma_f \rangle$ and the thermal fission rate $R_f$ will influence the total average reactor power $\langle P_{tot} \rangle$ in the following way $$\langle P_{tot} \rangle = V \langle \phi \rangle \sum_i \frac{\langle E_{f,i} \rangle}{R_{f,i}} = V \langle \phi \rangle \sum_i \frac{N_i \langle \sigma_{f,i} \rangle}{R_{f,i}} \qquad (2)$$

where the summation index i runs over the fissile isotope species in the reactor core, and $N_i$ is the number of the $i^{th}$ fissile isotope species per unit volume. The thermal fission rate $R_{f,i}$ for the $i^{th}$ fissile isotope species is defined as the rate of fission for that isotope species to produce 1 W of thermal power, and is inversely proportional to the thermal energy per fission $E_i$ for that species.

Referring to FIG. 1A, a schematic illustration of one example of a monitoring system 100 is shown adjacent a nuclear reactor 102. The system 100 may be used in combination with a variety of suitable nuclear reactors 102, including, for example, the Canada Deuterium Uranium (CANDU) reactor, boiling water reactors (BWR), pressurized water reactors (PWR), pressurized heavy water reactors (PHWR) and the like. In the illustrated embodiments, the nuclear reactor 102 includes a reactor core 104 that contains nuclear fuel bundles 106 holding fissile nuclear fuel material. When in use, reactions within the reactor core 104 produce free neutrons 108 (which may include a combination of fast neutrons and thermal neutrons) and other particles. Some of the neutrons 108 are consumed in the fission process, but some neutrons 108 tend to escape the core 104. In the illustrated example, the reactor 102 also includes a radiation shield 110 that surrounds the core 104 and is intended to impeded and/or block the escaping neutrons 108 and reduce the likelihood that neutrons 108 will escape the beyond the radiation shield 110 and into the environment surrounding the reactor 102. The radiation shield 110 may be formed from any suitable material, including concrete, lead and the like and may be of any suitable configuration for a given reactor 102.

While intended to inhibit the escape of neutrons 108, the radiation shield 110 on a given reactor 102 may not be 100% effective, and a quantity of neutrons 108a may travel beyond the radiation shield 110 when the reactor is in use. The inventors have discovered that the characteristics of the escaping neutrons 108a can be measured and correlated with the traits/characteristics within the reactor core 104—and in particular with the composition of the nuclear fuel bundles 106. Optionally, the correlation may also be based on other reactor parameters, including its power output.

The monitoring system 100 described herein can optionally be configured to detect at least some of the neutrons 108a that have escaped the radiation shielding using one or more neutron detectors 120 that have been positioned outside the radiation shield 110 of the reactor 102, and preferably beyond a stand-off perimeter 122 defined around the reactor 102. The shape and location of the stand-off perimeter 122 may be determined by the characteristics of a given reactor 102, its surrounding buildings/structures and the surrounding environment.

Preferably, the system 100 will include one or more radiation detectors located outside the radiation shield 110 and configured to detect neutrons 108a that have passed through the radiation shield 110. More preferably, the system may include two or more radiation detectors that are each positioned outside the radiation shield 110 and are spaced apart from each other. If multiple radiation detectors are used they may be arranged to provide a detector array. This may help the system 100 detect escaping neutrons 108a (i.e. record a neutron flux) in two or more locations around the reactor 102. This arrangement may be advantageous in instances in which the radiation shield 110 is nonhomogeneous, in which case detectors that are positioned the same distance from the reactor 102, but are spaced apart from each other, may receive different neutron flux. In such embodiments, the system 100 may be configured to monitor neutron flux, and in particular changes in the neutron flux per unit reactor power, rather than focusing on an absolute measurement of the quantity of neutrons 108a detected at each location.

For example, a system 100 may be positioned around a given reactor 102 and operated for a period of time to empirically establish a neutron flux per unit reactor power baseline for the reactor 102 (which may include different absolute levels of neutron flux per unit reactor flux at different ones of the detectors 120). The length of this calibration time period may depend upon the nature of the reactor fuel cycle and the statistical precision of the detector count rate data, but may last for weeks or months. Then, when the system 100 is used to continue to monitor the reactor 102 going forward, it may detect changes in the neutron flux per unit reactor power (i.e. deviations from the expected baseline), and may alert system users to such changes. Optionally, if a deviation from a baseline flux is detected at only one of the radiation detectors 120 in the system, the system user may be prompted to check the neutron flux per unit reactor power at other radiation detectors 120 for the same time period. If a change in neutron flux per unit reactor power is not registered at the other radiation detectors 120, a system user may determine that the change in neutron flux per unit reactor power is not a result of changes in the operating conditions of reactor 102, and optionally may investigate further to determine if the change in flux per unit reactor power is due to a local environmental condition that may be affecting first radiation detector. Alternatively, if a corresponding change in the neutron flux per unit reactor is detected at multiple radiation detectors at the same time (i.e. a deviation from the expected baseline norm is detected, even if the magnitude of the deviation is different for different detectors), a system user may be led to determine that the change in neutron flux per unit reactor power is a result of changes in the reactor 102 and optionally may investigate further.

In some embodiments, at least one of the radiation detectors may be located outside the stand-off perimeter 122, and optionally all of the radiation detectors may be located outside the stand-off perimeter. This may help facilitate installation and removal of the radiation detectors, as placement of the radiation detectors may not impact, or require modification to the operation of the reactor 102. The radiation detectors used may be any suitable detector, and in the illustrated example are neutron detectors.

In the illustrated example, the system 100 includes four neutron detectors 120 for detecting emissions of neutrons originated from the nuclear fission reactions within the reactor 102 (only three are visible in FIG. 1A, with all four visible in FIG. 1B). The neutrons detected by the neutron detectors 120 are operable to detect the flux of escaping neutrons 108a and to generate corresponding outputs signals that are based on the neutron flux detected. The outputs signals from each of the neutron detectors 102 can be transmitted to a system controller 124 that can monitor the output signals, perform additional signal processing if desired, compare the detected values of neutron flux per unit reactor power to reference values (for example based on historic performance of a given reactor 102). In some implementations, the transmission of the output signals may be provided using a wired connection to the controller 124. However in other implementations, the signal may be transmitted to the controller wirelessly using any appropriate wireless communication protocol, or in any other suitable manner.

The controller 120 can be configured to receive one or more additional input signals, shown using input 126 in FIG. 1A, that may come from the reactor 102 and/or any other sensors, detectors, and the like that may be used with the system 100. For example, the controller 120 may be configured to monitor the power output of the reactor 102.

The controller 124 may also include a memory and may store information about a given reactor 102, such as the particular composition of the nuclear fuel that the reactor 102 is supposed to be burning, e.g. as reported to the IAEA or similar regulator. Using a combination of inputs, including the baseline neutron flux per unit reactor power for the reactor, the expected fuel composition, the neutron yield expected from the reactor 102 when burning the declared fuel composition and measurements of the reactor power output, the system 100 may be able to determine if a given reactor 102 is operating within its reported parameters by comparing the actual neutron flux per unit reactor power with the theoretical/expected neutron yield that ought to be present based on the reactor power output. For example, an analysis of this type may identify instances in which the reactor fuel composition differs from the fuel composition that was reported to the reactor regulator, and may prompt further investigation.

To calibrate for a given reactor 102, the radiation detectors 120 may be set-up and the system 100 can begin monitoring at a time when the actual fuel composition of the reactor 102 is known (e.g. when the reactor is first loaded, etc.) and the output power output can be measured. Based on the known fuel composition and optionally other reactor parameters, the expected changes to the fuel composition of the reactor 102 over time can be modelled using conventional modelling software, based on approaches such as Monte Carlo methods modeling three-dimensional neutron diffusion (heretofore referred to as "core-following simulation software"). A baseline of neutron flux per unit reactor power for the reactor 102 can be measured, and then deviations from the baseline can be detected if the measured neutron flux per unit reactor power no longer matches the expected flux based on conducted calculations. This may allow a system operator to confirm if a reactor 102 is operating as expected, or if its performance has deviated in some manner, which may warrant investigation. The system 100 can, in these situations, be operated as a compliance and/or audit tool allowing a system operator to compare determine if a given reactor 102 is operating in accordance with its claimed safety and production margins without requiring the system operator to have direct access to the reactor core, spent fuel or components. This may be useful in circumstances when the reactor operator is unwilling to provide such access, the reactor is dangerous and/or challenging to access physically and/or it is desired to "double check" the reactor operator's reported conditions with an independent measurement/determination of the reactor conditions.

The expected neutron flux per unit reactor power for a given reactor 102 can be determined (based on reactor core-following simulation data, monitoring the neutron flux per unit reactor power during a calibration period to empirically develop a base line for the reactor, a combination of these and the like) and stored in the controller. The measured neutron flux per unit reactor power can then be compared to the expected neutron flux per unit reactor power, and the controller may generate an output based on the comparison. For example, the controller may alert a system user if the measured neutron flux per unit reactor power differs from the expected neutron flux per unit reactor power. The controller may, optionally, be configured to produce more than one alert level—for example based on the magnitude of the difference between the measured neutron flux per unit reactor power and the expected neutron flux per unit reactor power. For example, the controller may generate a low priority alert if the measured neutron flux per unit reactor power is within about 1% of the expected flux per unit reactor power, and a high priority alert if the measured neutron flux per unit reactor power is more than 3% different than the expected neutron flux per unit reactor power.

While a single detector 120 could be sufficient to provide the desired monitoring in some instances (as it can collect the relevant data), in a preferred embodiment of the system 100 multiple detectors 120 would be used.

The neutron detectors 120 used in the system 100 may be any suitable type of detector that provides a detector signal-to-background ratio on the order of 10 or more with reactor at operating power. Achieving this will depend upon the sensitivity of the detector, the size of the detector, the incident neutron flux available from the reactor, and the size of the neutron background in the local environment. Experience with large area detectors that are about 10% efficient with active detection area on the order of 0.1 m$^2$ is sufficient when the incident neutron flux is on the order of $10^{-1}$ cm$^{-2}$ s$^{-1}$, against a cosmic ray-induced neutron background on the order of $10^{-2}$ cm$^{-2}$ s$^{-1}$. The use of large-area neutron detectors may help the neutron detectors 120 capture a desirable portion of the neutron flux, and may help the detectors generate a useful output signal even if the quantity of neutrons 108a escaping the shielding 110 is relatively low. For example, in the same neutron flux conditions, a system utilizing smaller neutron detectors may produce output signals that are relatively weaker and/or may have a less desirable signal to noise ratio.

Some neutron detectors may be more effective at detecting thermal neutrons than fast neutrons (other operating conditions being equal). As the radiation shielding 110 surrounding the reactor core 104 is also believed to be more effective at stopping thermal neutrons than stopping fast neutrons, it is anticipated that the neutrons 108a escaping the shielding 110 may have a relatively higher proportion of fast neutrons to thermal neutrons as compared to the neutron flux within the core 104. Optionally, the system 100 may include a moderator positioned between the radiation detector 120 and the reactor 102 to help slow neutrons in the neutron flux 108a, and to convert at least some of the fast neutrons into thermal neutrons that can be more easily detected. The moderator may be any suitable moderating material, including a liquid or a solid, and optionally may be formed from high density polyethylene (HDPE). One example of a moderator 128 is schematically illustrated in FIG. 1B as an object positioned one of the detectors 120 and the reactor 102, but in other examples the moderator 128 may be provided as part of the radiation detector 120 instead of being provided as a separate member. The moderator 128 may have any suitable configuration, and may have a moderator thickness 130 (i.e. the thickness of the moderator material in the direction the neutron flux travels through the moderator 128 to reach the detector) of between about 0.1 inches and about 5 inches or more, and optionally may be between about 0.5 inches and about 3 inches and may be about 1 inch. A plot showing some measured detector count rates vs moderator material thickness (for a high density polyethylene moderator) illustrates a peak detector count rate at about 1 inch (about 2.5 cm) of moderator, where zero thickness corresponds to the absence of the moderator 128. This result helps confirm the belief that the neutrons 108a that are leaking beyond the shielding 110 may have a relatively high proportion of fast neutrons, and that using a suitable moderator layer may help improve measurement efficiency (i.e. help increase detector counts), whereas providing a moderator layer that is relatively thinner or relatively thicker may reduce the detection efficiency. This may also be understood from the point of view that the neutron energy spectrum in a thermal (moderated) reactor core contains a thermal spectral component (peaked near thermal equilibrium energy) and a fission spectral component (with average energy near 2 MeV in some circumstances) which may be bridged by an epithermal regime. Absorption of neutrons within the reactor core may preferentially select low energy neutrons, possibly due to their higher absorption cross section relative to higher energy neutrons. The higher energy neutrons within the reactor correspondingly may have a higher leakage probability. FIG. 7 is consistent with the detector on average receiving higher energy neutrons that have been partially moderated by the detector's exterior environment.

Alternatively, instead of using a moderator 128 to convert fast neutrons to thermal neutrons, the system 100 may include radiation detectors that are configured to directly detect fast neutrons, and/or a combination of fast neutron detectors and thermal neutron detectors.

One example of a suitable large-area neutron detector is a Boron Coated Straw (BCS) detector made by Proportional Technologies Inc. (Houston, Tex., USA). FIG. 2 shows an illustrative, schematic diagram of the structure of a one example of a BCS detector 200. Such detectors generally comprise a housing 202 with a number of sealed aluminum tubes 204 arranged in parallel. Within each aluminum tube 204, are copper "straw" tubes 206 arranged in a bundle. As shown in FIG. 3, each straw tube 206 coated with $^{10}$B-enriched boron carbide ($^{10}B_4C$) and a tensioned wire 208 along the long axis of each straw tube. In an example configuration the BCS detector may have seven aluminum tubes may be arranged in parallel and within each aluminum tube, seven additional copper "straw" tubes are arranged within providing a total of 49 straw tubes. Each straw may be sealed with an end cap and the interior of the straw tubes be filled with gas such as $Ar/CO_2$ gas (90/10 ratio) at 10.5 psi.

Another example of a large-area neutron detector consists of seven sealed "B10+" stainless steel tubes (2.45 cm diameter, 101.6 cm active length) from General Electric Reuter Stokes (Twinsburg, Ohio, USA) lined with an elemental $^{10}B$-enriched coating, and filled with 0.75 atm $^3He$, along with Ar and $CO_2$, to a total pressure of 16.22 psi. The tubes collectively present an active area of 1 m×0.18 m on the broadest sides.

Referring still to FIG. 3, thermal neutrons captured in the $^{10}B$ coating may be converted into secondary particles, through the $^{10}B(n,\alpha)$ reaction as described in the formula below (the probability of a given reaction's occurrence denoted within the brackets):

$$n+^{10}B \rightarrow {}^7Li^* + \alpha + 2.3 \text{ MeV} (94\%) \quad (3)$$

$$n+^{10}B \rightarrow {}^7Li + \alpha + 2.8 \text{ MeV} (6\%) \quad (4)$$

The secondary $^7Li$ and $\alpha$ (or $^4He$ nucleus) particles may be emitted in opposite directions, isotropically, as dictated by the conservation of energy and momentum. One of the two charged particles may enter the straw tube and ionize the gas contained within the straw. For each straw tube, a voltage can be applied such that the tube wall can act as a cathode while a thin wire tensioned within its center can be operated as an anode electrode. As a result of gas ionization, electrons liberated in the gas can migrate from the cathode to the anode. During this migration avalanche multiplication of electrons can result as a result of an electric field produced by the voltage across the straw tube so that a detectable electrical charge can be measured using appropriate electronics.

Thermal neutrons may also be captured in $^3He$ gas through the $^3He(n,p)^3H$ reaction as described in the formula below:

$$n+^3He \rightarrow {}^3H + p + 0.764 \text{ MeV} \quad (5)$$

For each proportional counter tube, a voltage can be applied such that the tube wall can act as a cathode while a thin wire tensioned within its center can be operated as an anode electrode. With $^3He$ gas filling space between the anode and cathode, its reaction products instigate gas ionization wherein electrons liberated in the gas can migrate from the cathode to the anode. An electrical charge can be measured using appropriate electronics, as a result of this avalanche multiplication of electrons.

For example, a charge sensitive preamplifier and shaping circuitry can be used to produce a low-noise pulse for each neutron event. The electronic pulses can be captured, for example, using a data acquisition card. Each pulse detected may correspond to a "detector count". Thus, the number of detector counts over a period of time may be used to determine a detector count rate. The detector count rate can be compared against a corresponding measured detector thermal reactor power. Accordingly, having a priori knowledge of the isotopic-dependent properties of various reactor fuel materials, detection of changes in isotopic composition of a reactor core may be possible based on the detector counts and detector count rates.

To test the performance of one embodiment of a system 100, one example of a system 100 was deployed to detect of neutron escaping during the operation of the National Research Universal (NRU) reactor, located at the Chalk River Laboratories (Chalk River, Ontario, Canada) operated by Canadian Nuclear Laboratories Inc. The NRU reactor is heavy water cooled and moderated, with online re-fueling capability. It is licensed to operate at a maximum power of 135 MW, and has a peak thermal flux of $4.0 \times 10^{14}$ $n/cm^2/s$.

The NRU reactor consists of various types of rods, including driver fuel rods, Mo-99 and Co-60 production rods, absorber rods, and control rods. The NRU driver fuel is a low-enriched uranium (LEU) fuel alloy of Al-61 wt % $U_3Si$, in which $U_3Si$ particles are dispersed in a continuous aluminum matrix, with 19.8% U-235 in uranium.

BCS detectors, as described previously comprising a total of 49 straw tubes, were deployed for neutron detection. Each straw tube may be biased at a high voltage to establish the necessary electric field to generate the electron avalanche. For example, in the experimental setup, the straw tubes were be biased with +1000V using a high voltage supply. The 49 straw tubes can each provide a signal output such that and each signal output can be added together using a summing amplifier. A DC power supply can be used to provide +/−5 V to each of the signal output ends, and the summing amplifier.

The output of the summing amplifier can be further processed using appropriate signal conditioning components. For example the summing amplifier output can be first processed using a shaping amplifier (Ortec 671 shaping amplifier), a channel analyzer (an Ortec 406A single channel analyzer), and an Ortec 416A gate and delay generator. The processed signal can be provided to a data acquisition system such as a National Instruments (NI) cRIO-9023 real-time controller through a NI 9402 LVTTL high-speed bidirectional digital I/O module. The NI cRIO-9023 can be configured to provide time-stamping of individual pulses that correspond to detected neutron events. Time-series plots of captured pulses may be used to provide a record of detector counts as a function of time, which permits examination of changes in count rate (i.e. neutron detection rates) during measurement.

The B10+ detector tubes are biased to +700 V. The high voltage is supplied by a NPM3100E neutron pulse monitor (NPM) from Quaesta Instruments (Tucson, Ariz., USA), which also processes pulses through a charge sensitive amplifier, a fixed gain pulse-shaping amplifier, a variable gain amplifier, and an analog to digital converter, before using firmware algorithms to analyze the digitized data. The NPM was used to record time-stamped pulses in list mode.

For the experimental setup, the system 100 included a detector array having two neutron detectors at two different locations in proximity to NRU, outside the reactor shielding and at a stand-off distance. A first placement location (referred to as location A) corresponded to a position within the NRU reactor building, located approximately 17 m from the NRU reactor core and two levels below the main reactor floor. A second placement location (referred to as location B) corresponded to a position outside of the NRU reactor building in another structure (a portable trailer building), approximately 69 m from the NRU reactor core. Each of the BCS neutron detectors in the experiment were coupled to the data acquisition system to produce a count rate as a function of time during the course of measurement and then compared against NRU's measured thermal reactor power. The detectors were operated over two time periods, from November to December 2014 and from April to August 2016.

For each neutron detector, its count rate as a function of time was recorded during the course of the measurement. This data is compared against NRU's simultaneously measured thermal reactor power, as illustrated in FIGS. 12 and 13. The NRU reactor typically undergoes a scheduled shutdown and subsequent start-up every few weeks of operation, which also occurred during the course of neutron measurements. The shutdown and startup procedures provided an opportunity to assess the sensitivity of the BCS and B10+ neutron detectors to reactor shutdown and startup. FIGS. 4A and 4B show that the count rate of the B10+ detector at locations A and B, respectively as a function of average reactor power (MW) during reactor shut-down and subsequent start-up. FIG. 12 shows that the neutron detector count rate generally correlates with the thermal reactor power, including during the course of reactor start-up and shutdown. Some background count rate can be seen when the reactor is shutdown, due to neutrons from cosmic ray background radiation. FIG. 12 also shows that the neutron detection count rate generally follows the average reactor power through its temporal fluctuations while the NRU is at power. This suggested to the inventors that the ratio of reactor power to detector count rate is a meaningful quantity to follow. FIG. 13 demonstrates how the ratio of reactor power to detector count rate remains relatively constant while the reactor is at power FIGS. 4A and 4B are plots of measured neutron flux detection rate vs. reactor power, and shows a correlation between detector count rate and NRU's thermal reactor power during the course of reactor startup and shutdown. It was noted that the signal (e.g. from the NRU reactor operating) to background (e.g. when NRU reactor is shutdown) ratio ranges from about 7:1 to 10:1 at location B.

During the testing it was noted that the signal from location A is less than half in terms of the number of counts as compared to location B, even though location A was positioned at a closer to the reactor. It is believed that this may be attributable to increased shielding and overburdening for neutrons to reach location A, as compared to reaching location B.

The experimental measurements may also be compared with simulated neutron emission based for the same measurement periods noted previously (November to December 2014 and from April to August 2016). Mass inventory of the fissile plutonium (Pu) and uranium (U) isotope of the reactor core can be extracted from the simulation for the periods. The ratio of neutron flux per unit of reactor power can be calculated from simulated fissile isotope mass inventors using the following relationship:

$$\frac{\phi}{P_{tot}} = \left[ N_A \sum_i \frac{m_i \sigma_{f,i}}{w_i R_{f,i}} \right]^{-1} \quad (6)$$

where, $\phi$=Average neutron flux; $P_{tot}$=Total reactor power; $N_A$=Avogadro's Number; $m_i$=Mass of $i^{th}$ fissioning species; $\sigma_{f,i}$=Average fission cross section of $i^{th}$ fissioning species; $w_i$=Atomic weight of $i^{th}$ fissioning species; $R_{f,i}$=Fission rate of $i^{th}$ fissioning species for 1 W of reactor power.

It has been discovered by the inventors that the neutron detection count rate has a substantially linear dependence on average nuclear reactor power. This linear dependence is exhibited in FIG. 4B, which shows a linear regression fit applied to the B10+ detector count rate at Location B as a function of average reactor power, during reactor start-up and shut-down periods. It is noted that the neutron detector count rate shown is not corrected for any environmental influences, whether from changing atmospheric conditions or changing operational environment; the contribution of these factors is in the minimal scatter present in the figure.

FIG. 5 shows the experimental data (detector count/reactor power) versus simulated data (neutron flux/reactor power). The simulated data for this comparison was generated using core-following neutron diffusion simulation software called TRIAD (T. C. Leung and M. D. Atfield, "Validation of the TRIAD code used for the neutronic simulation of the NRU reactor", Proc. 30$^{th}$ Annual Conference of the Canadian Nuclear Society, Calgary, Alberta, Canada, May 31-Jun. 3, 2009). The error bars are standard deviations of the mean, each taken over the period of about one month. In this plot, the experimental data is displayed relative on the y-axis, against the simulation data displayed relative on the right x-axis. A linear fit has been applied to the experimental data shown, demonstrating a linear relationship between the detector count rate per unit reactor power and the calculated neutron flux per unit reactor power.

In view of the foregoing, changes in the detection rate, which correlates with changes in reactor core power can be used to follow variations in reactor power. For example, isotopic-specific characteristics of various isotopes as shown in Table 1 above, can be used to infer changes in reactor composition based on time-based variations in detection rate. Specifically, for the described experimental detection array, variations in reactor power (up to ~100 MW) can be measured with a signal to noise ratio of up to 10 to 1. Furthermore, variations in isotopic composition in the reactor core can also yield about a 10% change in neutron flux per unit reactor power that is discernable from time-dependent neutron detection count rate data. As such, analysis of the variation in detection rate may provide further information about the reactor, in particular, an indication of the changes in isotopic composition within the reactor. This can be achieved, for example, by examining the direction and extent of how the measured detector count rate per unit reactor power deviates from the expected value. The expected value is based on baseline data from previous calibration measurements. This deviation can be corroborated against and interpreted by knowledge of the initial reactor composition from a reference date prior to the deviation occurring, and utilizing reactor core-following simulation data. These deviations are direct signals of changes in fission rate. The interpretation of these changes in terms of changes in mass inventory of the reactor core is dependent upon baseline data both from empirical neutron detector measurement, and from calculations with core-following Monte Carlo simulation software.

Another application of the system and methods described herein may be as a tool for independent verification purposes in safeguards applications, as the system may be sensitive to changes in fissile isotope inventory in the reactor core. As an example a simplified model was employed to relate the neutron flux per unit reactor power to reactor parameters that depend upon the fissile isotope inventory of the reactor core. This model assumed that the neutron flux $\varphi$ in the core is an appropriate space and energy averaged value, and that the fission cross section for the $i^{th}$ fissioning species is a corresponding average cross section $\sigma_{f,i}$. In a real reactor, the neutrons are not monoenergetic, and for each neutron energy there is a corresponding flux and cross section that can vary with time and position in the reactor. Instead, the simplified model here uses the aforementioned average quantities on the grounds that most of the fissions in a thermal reactor occur in the thermal energy region, where both the neutron flux and fission cross section values are large.

In the simplified model above, the quantities that vary in equation (1) over this time scale are the fissile isotope masses $m_i$, particularly as the $^{235}$U isotopes are burned up and produce other isotopes of U and Pu. As the NRU reactor undergoes online re-fueling on a routine basis, the fissile isotope inventory of the reactor core normally remains relatively constant. However, in the recent past, the extent of the fueled region in the reactor core was increased, and the quantity of $^{59}$Co absorber in the core was significantly increased for production of high specific activity $^{60}$Co. As a result of these changes, the NRU reactor required more frequent re-fueling, and consequently a smaller fraction of the uranium present in the fuel is consumed. Consequently, the maintained uranium mass inventory relative to the plutonium present in the core increased as a result of these changes. Using the mass inventory numbers provided by TRIAD over time, up to a 10% reduction in neutron flux per unit reactor power is predicted by Equation (6). This is shown in FIG. 5, along with a linear regression fit with a slope of 0.60±0.11 cpm cm² s, and a y-intercept of 0.082±0.13 cpm/MW. The error bars shown are standard deviations of the mean, each taken over the period of a month.

Table 2 below shows the changes in average fissile isotope masses in the April to August 2016 time frame, relative to the 2014 November to December time frame, corresponding to data shown in FIG. 5.

TABLE 2

| ISOTOPE | MASS DIFFERENCE (kg) | Mass Percent Change Relative to Total Isotope Mass (%) |
|---|---|---|
| $235_U$ | 2.864 | 11.70 |
| $238_U$ | 75.114 | 34.08 |
| $239_{Pu}$ | 0.07157 | 15.21 |
| $241_{Pu}$ | −0.00993 | −36.45 |

On another occasion, the start-up of pressurized test loop facilities connected to the core of NRU was coincident with substantial increases to the Pu content of the core, while the content of U isotopes in the core each did not change by more than 3%, as described in Table 3(a) below, which shows the change in average fissile isotope masses in the September to October 2016 time frame, relative to the 2016 October to November time frame. As summarized in Table 3(b), which shows a change in measured neutron count rate at Location B per unit reactor power, and predicted in-core neutron flux, corresponding to isotopic changes shown in Table 3(a), these changes in isotope content resulted in significant changes in neutron count rate per unit reactor power (averaged over a few weeks) that are corroborated with significant changes in predicted neutron flux per unit reactor power, based on TRIAD data.

TABLE 3a

| ISOTOPE | MASS DIFFERENCE (kg) | Mass Percent Change Relative to Total Isotope Mass (%) |
|---|---|---|
| $235_U$ | 0.529 | 2.10 |
| $238_U$ | −13.1 | −2.80 |
| $239_{Pu}$ | 0.173 | 15.1 |
| $241_{Pu}$ | 0.166 | 41.6 |

TABLE 3b

| Quantity | B10+ Detector count rate per unit reactor power, Location B (cpm/MW) | Estimated in-core neutron flux (cm$^{-2}$ s$^{-1}$ MW$^{-1}$) |
|---|---|---|
| Before start-up of test loop | 6.646 ± 0.088 | (1.1445 ± 0.0027)E+07 |
| After start-up of test loop | 6.263 ± 0.073 | (1.1098 ± 0.0024)E+07 |

As shown in FIG. 5 and Tables 2 and 3(a) and 3(b) the inventors noted that a relatively small reduction, such as a few percent, in the neutron flux per unit power of the NRU, due to changes in the isotopic inventory in the reactor core, contributed to a relatively significant detector count rate per unit reactor power while at a stand-off distance from the reactor core (seen at both locations A and B). This helps demonstrate that the technique of stand-off reactor monitoring using neutron detection may be used as means of independently verifying when there is a change in the fissile isotopic inventory of a thermal nuclear reactor, in some operating conditions. For example, the data shown in Tables 2 and 3(a) and 3(b) above demonstrate that with neutron detection at stand-off distances outside of a reactor core, it is possible to measure the movement of kilogram, and even sub-kilogram quantities of fissile Pu and U isotopes.

It is also noted that the above performance may be affected by the detection efficiency of the particular neutron detector that is employed, and/or the environment in which the detector is placed. The environmental factors may include the size of the reactor and the neutron flux that it produces, the nature and extent of the reactor shielding and the neutron flux leakage that it permits, the overburden/influence of other building infrastructure that may exist between the exterior of the reactor shielding and the neutron detector's location, and the changing operational environment.

For example, to examine the influence of the local environment, FIG. 3 compares BCS detector data acquired at Location A with B10+ detector data taken simultaneously at Location B. From FIG. 14, it is evident that the B10+ detector data at Location B is about 7.5 times greater on average than the BCS detector data at Location A. Although the B10+ detector may be more efficient at detecting neutrons than the BCS detector by nearly a factor of 2, Location A also presents substantially more environmental shielding and overburden than Location B in the current experimental set-up. The shielding infrastructure between the reactor core and Location A presents roughly 7 m of high density concrete flooring and shielding, 0.5 m of steel side thermal shield, and 0.5 m of water reflector. Many neutrons located at Location B may have leaked through the top deck plate of reactor and may scatter in the main reactor hall before escaping through the exterior walls and windows of the reactor building; leaking through the top of the reactor presented approximately 1.2 m of steel and 3 m of water in shielding.

FIG. 14 also shows that Location B data exhibits regular 50% decreases in detector signal, while the Location A data does not. FIG. 15 shows that in spite of these regular 50% deviations in signal at Location B, the simultaneous signals from Locations A and B correlate very well with each other. In fact, the 50% deviations in detection rate at Location B match the timing of online refueling activities occurring at the top of the reactor, as detailed in FIG. 16. Although the reactor power may decrease during online refueling, it does not always do so, and the B10+ count rate drops well before there is any change in reactor power, if there is any. Rather, the drop in B10+ count rate may result from the fuel rod flask blocking neutrons escaping from the top of the reactor, when the flask is positioned over top of the reactor during reactor rod movement. The spikes in count rate often observed in the middle of the drop in B10+ count rate coincide with freshly irradiated fuel rods moving out of the reactor core into the flask, and decaying over a 30 min period. These events were not recorded at Location A, as the position of this location and the significant amount of fixed shielding presented to this location prevents a detector at Location A from seeing neutrons from the top of the reactor.

Because of these local environmental effects on the performance of the stand-off monitoring system, such as the fact that detector at Location B appears to have been able measure online refueling events, while a detector at Location A could not, it may be useful in some embodiments of the system to ensure that multiple detectors (i.e. two or more) are placed at multiple locations around a target reactor or other object to be measured. This may allow the detection signals from each detector to be compared with each in order to help discriminate meaningful changes in the reactor's output from local events, background emissions and other interference.

Figure 1:
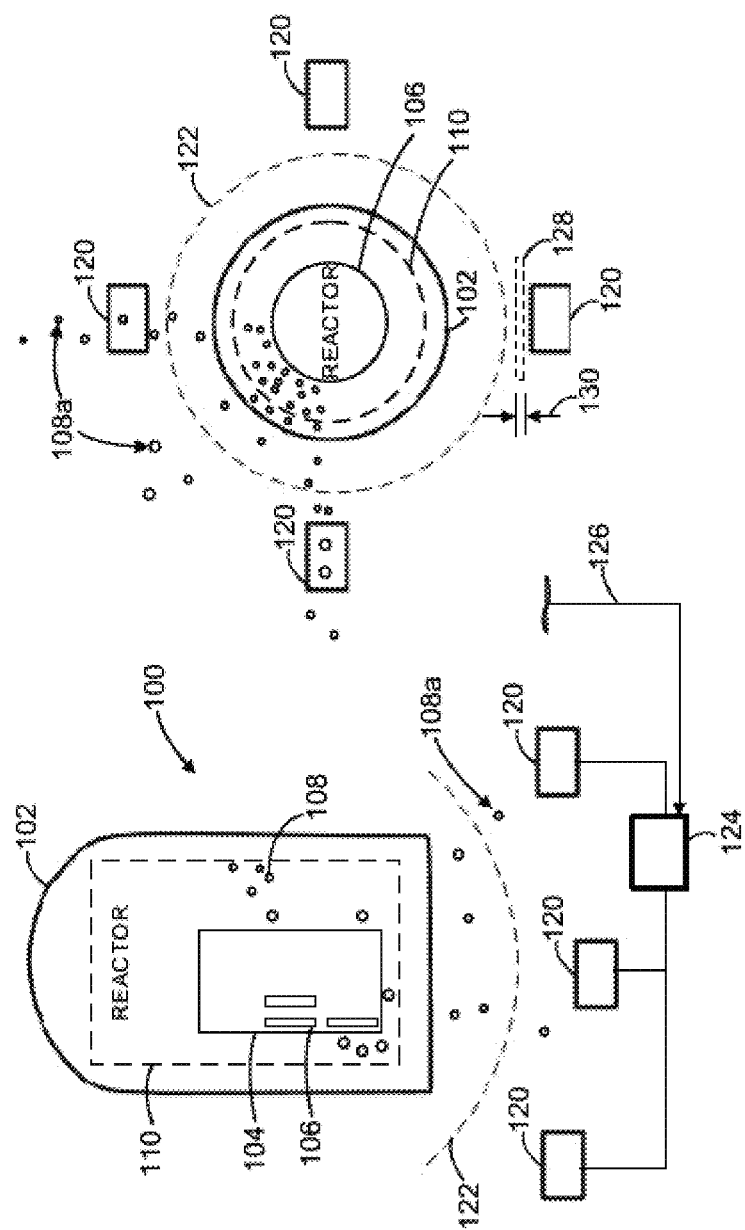
FIG. 1A is a schematic representation of one example of a monitoring system positioned around a nuclear reactor.
FIG. 1B is another representation of the monitoring system and reactor of FIG. 1A.

Referring now to FIG. 6, one example of a method 600 of using a system, such as system 100, to determine the isotopic composition of the fuel in a nuclear reactor core, when isotropic properties of materials within reactor is known (e.g. the properties listed in Table 1). At step 602, at least one, and preferably two or more, neutron detectors 120 such as the BCS detectors may be distributed around the target reactor and outside its radiation shield, optionally at a standoff distance. For example, as shown in FIG. 1 the detectors 120 may be distributed around the reactor core 104. In some other configurations, some detectors may be provided below the director core, at a standoff distance, within the reactor building.

With the detectors 120 in place, the system may, at step 604, determine an expected neutron flux per unit reactor power for the reactor being monitored, and may store this in a controller memory or the like. This expected neutron flux per unit reactor power can serve as the value against which the measured neutron flux per unit reactor power can be compared. This expected neutron flux per unit reactor power may be obtained from any suitable source, including from computer modeling/simulation data and/or an empirically derived neutron flux baseline as described herein, and the like. In the example method 600, the expected neutron flux per unit reactor power is illustrated as being obtained from either step 606, monitoring the neutron flux per unit reactor power received at the stand-off location over a calibration period to help determine a neutron flux per unit reactor power baseline for the target reactor, or step 608, based on data received from a computer simulation (e.g. TRIAD) of the operation of the target reactor in accordance with its reported operating conditions and determine a neutron flux per unit reactor power baseline for the target reactor from the simulation data. While two options are shown, other methods of obtaining the expected values of neutron flux per unit reactor power may be used.

For step 606, the detectors 120 may optionally be calibrated by detecting neutron emissions from the detector core 104 for a defined calibration period. In some cases, as discussed above, the calibration measurement period may be during a restart of the reactor 102 or after maintenance (or replacement of reactor fuel 106) and may last until the reactor 102 is shut down again for maintenance. In other cases, the measurement period may be a period of time between restart and subsequent shut down procedures. In yet other cases, the measurement period can last for several restart and subsequent shutdown periods. Measurements during this time period may help establish a baseline neutron flux per unit reactor power for a given reactor 102.

At step 610, the system 100 can be used to monitor the neutron flux (i.e. the detector counts) received at the stand-off location and the reactor power output over an active monitoring time period (i.e. a time period in which the compliance inspection of the reactor is desired). The data from the detectors 120 during the active monitoring time period can be logged and processed so that a detector count rate (e.g. number of detector counts per unit of time) can be determined for each detector 120.

At step 612, having determined the detector count rates, the system 100 can compare the measured neutron flux rates per unit reactor power against the expected neutron flux rates per unit reactor power. If differences of a sufficient magnitude are noted, the system may generate an alert (step 614), indicating that the target reactor appears to be operating in a manner that deviates from its expected operating conditions. This may be considered a relative type of analysis, in which the absolute value of the neutron flux per unit reactor power need not be directly reported to a system user, and instead the alert can be based on the relative deviation of the measured neutron flux per unit reactor power from the expected neutron flux per unit reactor power. Alerts of this nature may be at least one criteria that a safeguards inspector may use to determine (for example, through remote monitoring) if further investigation of the target reactor and its operating conditions are required.

Optionally, instead of, or in addition to, the relative, comparative type analysis, the system may also be configured to analyze the measured neutron flux, and associated reactor power output, and compare it against known fission rates of various fuel materials and compositions (such as the baseline measurements, reactor core-following simulation data and the like). For example, changes in detector count rates may be used to indicate a transformation of one type of fissile material to another within the reactor core 104. In such configurations, the system 100 may be able to determine the isotopic composition of the fissile material within the target reactor, and this information may then be compared to the records or simulations that set out the expected nuclear fuel composition (based on the reported reactor operating parameters). Optionally, some of the method steps, such as steps 604-612 and/or 610-612 can be performed iteratively (at any desired sampling rate), as indicated using dashed arrows.

Optionally, the method 600 may be performed independently for each detector 120 in the system. Alternatively, the outputs from multiple detectors 120 may be considered together by the controller 124. For example, steps 610-612 may be performed for each detector 120 and their results noted by the controller 124. If each detector 120 has recorded a neutron flux within the expected range, the controller 124 can determine that no alert condition is present. If, alternatively, if one detector 120 records an anomalous neutron flux reading, the controller 124 may query other detectors 120 (as explained herein) to determine if they also detected a deviation from the expected neutron flux (even if of a different magnitude than the first detector) before triggering an alert. Optionally, the controller 124 may also re-query the detector 120 that recorded the anomalous reading at a later time to determine if the unexpected reading is persistent or was merely transient. Both of these techniques, amongst others, may allow the controller 120 to determine if a deviation in the neutron flux is a result of a change in reactor conditions (an event that should trigger an alert) or is a result of environmental effects or other non-reactor related events (an event that ought not to trigger an alert).

Stand-off neutron monitoring using, optionally, large area neutron detectors may be used to monitor sites or containers where neutron-emitting $^{238}$U or Pu is stored. Such sites could in principle include used fuel dry storage containers or sites, fuel recycling and reprocessing facilities, and mixed oxide fuel fabrication facilities.

To help evaluate examples of such monitoring systems, this disclosure also describes a Monte Carlo model of a large-area neutron detector at various locations around the ZED-2 research reactor at Chalk River, ON, Canada. MCNP6 has been employed to construct and evaluate the Monte Carlo models of a large-area neutron detector at several locations outside of the reactor shielding of ZED-2 as discussed herein. The large-area detector in the model is based on a boron-lined neutron detector from Proportional Technologies, Inc. (Houston, Tex., USA), which has an active cross-sectional area of 1 m×0.18 m. The modelled detector, which can be referred to as a Boron-Coated Straw (BCS) detector, consists of seven sealed aluminum tubes (2.54 cm diameter, 1 m long), each of which consists of 7 10B-enriched B4C coated straw detectors (7.5 mm in diameter, 1 m long). Each straw is filled with Ar/CO2 gas (90/10) at 10.5 psi. The detector has a total of 49 sealed straws. This detector has been used to acquire neutron data signals at locations around the ZED-2 reactor; the experimental data is used to compare against simulation results reported here.

The simulation approach is divided into three smaller simulations (stages) that each build upon the previous simulation's calculated neutron field. Specifically, neutron tracks that pass through designated surfaces of one simulation are recorded and are used as the source neutrons of the next simulation. In MCNP6, the cards to do so are the surface source write card (SSW) and the surface source read card (SSR).

Stage 1 is the core of the reactor, which is where the core neutron flux is calculated. The neutron flux from fission in the reactor core is generated from a kcode criticality calculation. Stage 1 is kept as a separate stage to facilitate changing of core models. Stage 2 is the building model—consisting of the reactor shielding, two rooms in the reactor building and volumes to contain detectors. Stage 3 is used to transport neutrons from the volumes surrounding the BCS detector into the detectors themselves and perform flux tallies of heavy ions produced from neutron capture in the boron coating of the BCS detector. There are currently three locations for detectors in the models. Stage 3 was designed as a separate stage so that changing detectors in subsequent models/experiments may be relatively easier (i.e. using a different detector in place of the BCS or rotating the detector orientation) and so that heavy ion and alpha particle physics can be turned off for the first two stages of the model.

The stage 1 core model is based on the model documented in ZED2-HWR-EXP-001 in the International Reactor Physics Benchmark Evaluation Project, and was modified to include all of the fuels and components present in the core during neutron detector data acquisition. Stage 1 may help facilitate the generation of a fission distribution in the critical reactor core, and determine a resulting neutron flux distribution. The flux distribution is saved as a list of neutron tracks for use as a source in subsequent stages of the calculation Stage 1 simulates the ZED-2 core, moderated with heavy water. The core is partially surrounded by a graphite reflector, all of which is contained in a concrete enclosure. The concrete shielding has been simplified in the model by, for example, not including vents or the holes where pipes go through the shielding.

Stage 2 is a building model 200. It contains the concrete shielding 202 around the reactor 204, the ZED-2 facility, and an adjacent room where neutron measurements were conducted. Technical drawings of the reactor and the surrounding building were used to get the dimensions and material compositions for this stage of the model. The neutrons recorded in stage 1 are read onto a surface inside the reactor shielding 202. The volume inside of the cylinder that they are read to, used to define the reactor 204, is voided (given a neutron importance of 0) so that the neutrons are not double counted. The purpose of this stage is to transport the neutrons from the core to the three locations where detectors have been set up. A challenge in this stage involves getting enough neutrons through the concrete shielding to have acceptable statistics inside the detectors. Variance reduction using weight windows generated by the ADVANTG software package (Oakridge National Laboratory) was employed to alleviate this problem. The results of stage 2 are written to three separate hemispherical surfaces filled with air, each at positions where the BCS neutron detector has experimentally collected data.

The particles written to the three surfaces in stage 2 form the source for stage 3, which places a model BCS detector 206 in the enclosed volume of each surface. An MCNPX model of the BCS detector has been adapted into MCNP6, and employed in the said surface volumes. Flux tallies (F4 tallies) over the detector cells in stage 2 and current tallies (F1 tallies) in stage 3 can be compared to the experimental data to gauge how well the simulations match reality.

Simulations were run using low-enriched uranium (LEU) and natural uranium (NU) ZED-2 cores implemented in stage 1 of each simulation. In the kcode criticality calculation of stage 1, 6×10$^6$ neutrons were generated per cycle for 120 cycles, neglecting the first 20 cycles. Model neutron detectors 206 were positioned in locations immediately east and south of the reactor walls of ZED, and near a wall in room 208 adjacent to the south wall of the ZED-2 reactor room, as shown in FIG. 8.

The simulated neutron energy spectra recorded at the model neutron detectors are shown in FIGS. 9 and 10. Some trends evident in these spectra are brought out in FIG. 11, which displays area sums under three spectral regions: thermal (<3×10$^{-7}$ MeV), epithermal (3×10$^{-7}$ to <3×10$^{-2}$ MeV), and fast 3×10$^{-2}$ MeV). It can be seen that epithermal and fast region sums are larger for the East Side of the reactor than for the South Side, and larger for the LEU core than for the NU core. The thermal region area sums appear to show the inverse trends to the above trends, but the size of the error bars for the thermal region area sums preclude any definite conclusions.

TABLE 4

| Core | Location | Measured Flux (cm$^{-2}$ s$^{-1}$ W$^{-1}$) | Calculated Flux (cm$^{-2}$ s$^{-1}$ W$^{-1}$) | Diff. (%) |
|---|---|---|---|---|
| NU | Adjacent Room | 0.25 ± 0.03 | 0.213 ± 0.003 | −14 |
| LEU | Adjacent Room | 0.363 ± 0.04 | 0.443 ± 0.003 | 22 |
| LEU | East Side | 1.1 ± 0.1 | 2.74 ± 0.07 | 139 |
| LEU | South Side | 2.469 ± 0.3 | 3.3 ± 0.3 | 35 |

Table 4 compares reactor-power normalized neutron flux at the detector locations from simulation to that from experiment. The experimental data was flux normalized by reactor power, calculated from neutron count rates measured by a BCS detector. The simulated reactor power was calculated in order to normalize the simulated flux per unit power. To this end, a fission energy deposition (F7) tally was tabulated over all fuel in stage 1. The tally result was changed from MeV to Joules, and then multiplied by the ratio of total usable energy per $^{235}$U fission to the amount of prompt energy MCNP6 counts per $^{235}$U fission. This corrects the F7 tally to give the total energy the reactor releases instead of just prompt fission energy.

Two examples of neutron detectors that may be used in the systems and testing described herein are explained below. One example of a large-area neutron detector is a boron-lined detector from Proportional Technologies, Inc. (Houston, Tex., USA), which has an active area of 1 m×0.18 m on its broadest sides. The detector, heretofore referred to as a Boron-Coated Straw (BCS) detector, consists of seven sealed aluminum tubes (2.54 cm diameter, 1 m long), each of which consists of 7 $^{10}$B-enriched $B_4C$ coated straw detectors (7.5 mm in diameter, 1 m long). Each straw is filled with $Ar/CO_2$ gas (90/10) at 10.5 psi. The detector has a total of 49 sealed straws. The straws are biased with a +1000 V high voltage supply. The 49 straws provide signal output at each end of the detector tubes, and these signal outputs are added together using a summing amplifier. A DC power supply provides +/−5 V to each of the signal output ends, and the summing amplifier. The output of the summing amplifier is relayed via an Ortec 671 shaping amplifier, an Ortec 406A single channel analyzer, and an Ortec 416A gate and delay generator to a National Instruments (NI) cRIO-9023 real-time controller through a NI 9402 LVTTL high-speed bidirectional digital I/O module. The NI cRIO-9023 provides time-stamping of individual pulses.

Another example of a large-area neutron detector consists of seven sealed "B10+" stainless steel tubes (2.45 cm diameter, 101.6 cm active length) from General Electric Reuter Stokes (Twinsburg, Ohio, USA) lined with an elemental $^{10}$B-enriched coating, and filled with 0.75 atm $^{3}$He, along with Ar and $CO_2$, to a total pressure of 16.22 psi. The tubes collectively present an active area of 1 m×0.18 m on the broadest sides, and are biased with +700 V. The high voltage is supplied by a NPM3100E neutron pulse monitor (NPM) from Quaesta Instruments (Tucson, Ariz., USA), which also processes pulses through a charge sensitive amplifier, a fixed gain pulse-shaping amplifier, a variable gain amplifier, and an analog to digital converter, before using firmware algorithms to analyze the digitized data. The NPM was used to record time-stamped pulses in list mode.

To help facilitate data acquisition when using either type of detector, acquired binary list mode files may be off-line binned into one or more time-series histogram via C++ routine. The time-series plots may provide a record of detector counts versus time, which may help facilitate the examination of changes in count rate that occur during measurement. The detector count rate as a function of time during the course of measurement may be compared against NRU's measured thermal reactor power as a function of time.

What has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A method of remotely monitoring the isotopic composition of nuclear fuel material within a reactor core of a nuclear reactor comprising the reactor core and a radiation shield, the method comprising:
    a) at a first time within a monitoring time period, detecting a plurality of neutrons that originated within the reactor core and have passed through the radiation shield using a first neutron detector disposed outside the radiation shield and at a first stand-off location relative to the reactor to obtain a first neutron flux and transmitting the first neutron flux to a system controller;
    b) detecting the reactor power output at the first time with the system controller;
    c) determining a first neutron flux per unit reactor power value using the system controller by comparing the reactor power output at the first time with the first neutron flux; and
    d) generating a controller output signal based on a difference between the first neutron flux per unit reactor power value and an expected neutron flux per unit reactor power value for the nuclear reactor.

2. The method of claim 1, wherein step a) comprises positioning a second neutron detector at a second stand-off location relative to the reactor, wherein the second neutron detector is outside the radiation shield and is spaced apart from the first neutron detector, and at the first time detecting a plurality of neutrons that originated within the reactor core and have passed through the radiation shield using the second neutron detector to obtain a second neutron flux; determining a second neutron flux per unit reactor power value using the system controller by comparing the reactor power output at the first time with the second neutron flux; and comparing the second neutron flux per unit reactor power value to at least one of i) the first neutron flux per unit reactor power value and ii) the expected neutron flux per unit reactor power value.

3. The method of claim 2, wherein step d) comprises comparing the first neutron flux per unit reactor power value with the second neutron flux per unit reactor power value to identify differences between the first neutron flux per unit reactor power value and the second neutron flux per unit reactor power value.

4. The method of claim 1, further comprising generating an alert if the first neutron flux per unit reactor power value deviates from the expected neutron flux per unit reactor power value.

5. The method of claim 1, wherein the expected neutron flux per unit reactor power value comprises at least one of a calculated neutron flux per unit reactor power value and an empirically measured base line neutron flux per unit reactor power value for the nuclear reactor.

6. The method of claim 5, wherein the empirically measured base line neutron flux per unit reactor power value for the nuclear reactor is obtained by monitoring the nuclear reactor with the system during a calibration session prior to the monitoring time period when the nuclear reactor is operating under known conditions and storing the measured neutron flux per unit reactor power value in the system controller.

7. The method of claim 1, further comprising moderating the plurality of neutrons that originated within the reactor core and have passed through the radiation shield using a moderator prior to the plurality of neutrons reaching the first neutron detector, whereby at least a portion of the neutrons reaching the first neutron detector are thermal neutrons.

8. The method of claim 1, further comprising the step of determining the isotopic composition of nuclear fuel material within a reactor core based on the controller output signal.

9. The method of claim 1, further comprising, at a second time within the monitoring time period:
  a) detecting a plurality of neutrons that originated within the reactor core and have passed through the radiation shield using the first neutron detector to obtain a second time neutron flux and transmitting the second time neutron flux to the system controller;
  b) detecting the reactor power output at the second time with the system controller;
  c) determining a second neutron flux per unit reactor power value using the system controller by comparing the reactor power output at the second time with the second time neutron flux; and
  d) generating a second time controller output signal based on a difference between the second neutron flux per unit reactor power value and the expected neutron flux per unit reactor power value for the nuclear reactor.

* * * * *